(12) United States Patent
MacLean et al.

(10) Patent No.: US 8,595,055 B2
(45) Date of Patent: Nov. 26, 2013

(54) APPARATUS AND METHOD OF FACILITATING THE EXCHANGE OF POINTS BETWEEN SELECTED ENTITIES

(75) Inventors: Trevor Robert MacLean, Toronto (CA); Jerry Philip, Oakville (CA); Stephen Paul Ogden, Toronto (CA); Darlene Higbee Clarkin, Toronto (CA)

(73) Assignee: Points.com, Toronto (CA)

( * ) Notice: Subject to any disclaimer, the term of this patent is extended or adjusted under 35 U.S.C. 154(b) by 1835 days.

(21) Appl. No.: 09/818,400

(22) Filed: Mar. 27, 2001

(65) Prior Publication Data

US 2002/0143614 A1    Oct. 3, 2002

(51) Int. Cl.
*G06Q 30/00*    (2012.01)

(52) U.S. Cl.
USPC ........................................................ 705/14.1

(58) Field of Classification Search
USPC ...................................... 705/14, 26, 27, 14.1
See application file for complete search history.

(56) References Cited

U.S. PATENT DOCUMENTS

| | | |
|---|---|---|
| 5,991,376 A | 11/1999 | Hennessy et al. |
| 6,009,412 A | 12/1999 | Storey |
| 6,012,039 A | 1/2000 | Hoffman et al. |
| 6,018,718 A | 1/2000 | Walker et al. |
| 6,049,778 A | 4/2000 | Walker et al. |
| 6,119,933 A | 9/2000 | Wong et al. |
| 6,128,599 A | 10/2000 | Walker et al. |
| 6,193,152 B1 | 2/2001 | Fernando et al. |
| 6,246,997 B1 | 6/2001 | Cybul et al. |
| 6,251,017 B1 | 6/2001 | Leason et al. |
| 6,256,614 B1 | 7/2001 | Wecker et al. |
| 6,273,334 B1 | 8/2001 | Ijichi et al. |
| 6,273,816 B1 | 8/2001 | Bansal et al. |
| 6,289,318 B1 | 9/2001 | Barber |
| 6,301,471 B1 | 10/2001 | Dahm et al. |
| 6,327,573 B1 | 12/2001 | Walker et al. |

(Continued)

FOREIGN PATENT DOCUMENTS

| | | |
|---|---|---|
| EP | 99101600 | 1/1998 |
| EP | 99946685.7 | 9/1998 |

(Continued)

OTHER PUBLICATIONS

Birch, Dave E-cash lays the foundations for private corporate currency creation, Oct. 1996, Financial Technology International Bulletin, Dialog file 15: 01324975.*

(Continued)

*Primary Examiner* — Daniel Lastra
(74) *Attorney, Agent, or Firm* — Cowan, Liebowitz & Latman, P.C.; Mark Montague, Esq.

(57) ABSTRACT

This invention relates to a system and method of exchanging first points held by a customer for second points, wherein the first points that are issued by a first point issuer differ from the second points that are issued by a second point issuer. This method comprises the steps of permitting the customer to set a first number of first points to be exchanged and permitting the first and second point issuers to set the point withdrawal and deposit rates of their first and second points respectively. Next, an equivalent number of the second points is determined based upon the point withdrawal and deposit rates of the first and second point issuers respectively, and the first number of the first points. Then, the first number of points is exchanged for a second equivalent number of second points.

2 Claims, 30 Drawing Sheets

(56) References Cited

U.S. PATENT DOCUMENTS

| | | |
|---|---|---|
| 6,343,990 B1 | 2/2002 | Rasmussen et al. |
| 6,345,261 B1 | 2/2002 | Feidelson et al. |
| 6,378,043 B1 | 4/2002 | Girkar et al. |
| 6,398,216 B1 | 6/2002 | Humphrey |
| 6,405,175 B1 | 6/2002 | Ng |
| 6,416,406 B1 | 7/2002 | Duhamel |
| 6,424,951 B1 | 7/2002 | Shurling et al. |
| 6,457,883 B1 | 10/2002 | Silverbrook et al. |
| 6,486,768 B1 | 11/2002 | French et al. |
| 6,490,411 B1 | 12/2002 | Mazzacani et al. |
| 6,529,878 B2 | 3/2003 | De Rafael et al. |
| 6,542,568 B1 | 4/2003 | Howes, Jr. et al. |
| 6,549,912 B1 | 4/2003 | Chen |
| 6,564,189 B1 | 5/2003 | Nycz |
| 6,571,216 B1 | 5/2003 | Garg et al. |
| 6,578,735 B1 | 6/2003 | Mothwurf |
| 6,585,622 B1 | 7/2003 | Shum et al. |
| 6,594,639 B1 | 7/2003 | Bansal et al. |
| 6,594,640 B1 * | 7/2003 | Postrel ................ 705/14.27 |
| 6,597,903 B1 | 7/2003 | Dahm et al. |
| 6,669,559 B1 | 12/2003 | Baerlocher et al. |
| 6,741,993 B1 | 5/2004 | Zitaner et al. |
| 2001/0054006 A1 * | 12/2001 | Lee et al. ................ 705/26 |
| 2004/0193489 A1 * | 9/2004 | Boyd et al. ................ 705/14 |

FOREIGN PATENT DOCUMENTS

| | | |
|---|---|---|
| EP | 99954610.4 | 9/1998 |
| EP | 99307582 | 10/1998 |
| EP | 99119933 | 12/1998 |
| EP | 99310201 | 12/1998 |
| EP | 99960731.0 | 12/1998 |
| EP | 00915740.5 | 2/1999 |
| EP | 00200964 | 3/1999 |
| EP | 00928373.0 | 4/1999 |
| EP | 00303839 | 5/1999 |
| EP | 000938340.7 | 6/1999 |
| EP | 00946844.8 | 6/1999 |
| EP | 00964904.7 | 10/1999 |
| EP | 00974722.1 | 11/1999 |
| EP | 00983805.3 | 11/1999 |
| EP | 01101464.4 | 2/2000 |
| EP | 01902216.9 | 2/2000 |
| EP | 01105584.5 | 3/2000 |
| EP | 01923103.4 | 4/2000 |
| EP | 01931631.4 | 4/2000 |
| EP | 01936256.5 | 4/2000 |
| EP | 01945019.6 | 4/2000 |
| EP | 01926132.0 | 5/2000 |
| EP | 01949530.8 | 6/2000 |
| EP | 00959429.2 | 7/2000 |
| EP | 01306375.5 | 7/2000 |
| EP | 01964319.6 | 8/2000 |
| EP | 01271045.5 | 10/2000 |
| ER | 00993303.7 | 12/1999 |
| GB | 02131738 | 12/1999 |
| GB | 00029256 | 2/2000 |
| GB | 01279249 | 4/2000 |
| GB | 03016839 | 7/2000 |
| GB | 01190164 | 8/2000 |
| GB | 00232298 | 9/2000 |
| WO | WO 9913438 | 3/1999 |
| WO | WO 9920013 | 4/1999 |
| WO | WO 9923596 | 5/1999 |
| WO | WO 00/17794 | 3/2000 |
| WO | WO 0021008 | 4/2000 |
| WO | WO 00/34888 | 6/2000 |
| WO | WO 00/38088 | 6/2000 |
| WO | WO 00/60516 | 10/2000 |
| WO | WO 00/67187 | 11/2000 |
| WO | WO 00/79461 | 12/2000 |
| WO | WO 01/01307 | 1/2001 |
| WO | WO 01/04823 | 1/2001 |
| WO | WO 01/06438 | 1/2001 |
| WO | WO 01/08113 | 2/2001 |
| WO | WO 01/11472 | 2/2001 |
| WO | WO 0113563 | 2/2001 |
| WO | WO 01/25981 | 4/2001 |
| WO | WO 01/31531 | 5/2001 |
| WO | WO 01/33389 | 5/2001 |
| WO | WO 01/33442 | 5/2001 |
| WO | WO 01/34172 | 5/2001 |
| WO | WO 01/39052 | 5/2001 |
| WO | WO 01/39053 | 5/2001 |
| WO | WO 01/39058 | 5/2001 |
| WO | WO 01/41015 | 6/2001 |
| WO | WO 01/41612 | 6/2001 |
| WO | WO 01/43006 | 6/2001 |
| WO | WO 01/43031 | 6/2001 |
| WO | WO 01/43034 | 6/2001 |
| WO | WO 01/52156 | 7/2001 |
| WO | WO 01/57816 | 8/2001 |
| WO | WO 01/67365 | 9/2001 |
| WO | WO 01/77856 | 10/2001 |
| WO | WO 01/79966 | 10/2001 |
| WO | WO 01/82239 | 11/2001 |
| WO | WO 01/82240 | 11/2001 |
| WO | WO 01/82241 | 11/2001 |
| WO | WO 01/83062 | 11/2001 |
| WO | WO 01/83063 | 11/2001 |
| WO | WO 01/84280 | 11/2001 |
| WO | WO 01/86535 | 11/2001 |
| WO | WO 01/86545 | 11/2001 |
| WO | WO 02/01433 | 1/2002 |
| WO | WO 02/01457 | 1/2002 |
| WO | WO 02/05172 | 1/2002 |
| WO | WO 02/07038 | 1/2002 |
| WO | WO 02/07837 | 1/2002 |
| WO | WO 02/08869 | 1/2002 |
| WO | WO 02/08969 | 1/2002 |
| WO | WO 02/08970 | 1/2002 |
| WO | WO 02/11034 | 2/2002 |
| WO | WO 02/19091 | 3/2002 |
| WO | WO 02/21407 | 3/2002 |
| WO | WO 02/25539 | 3/2002 |
| WO | WO 02/35339 | 5/2002 |
| WO | WO 02/35398 | 5/2002 |
| WO | WO 02/37303 | 5/2002 |
| WO | WO 02/061524 | 8/2002 |

OTHER PUBLICATIONS

Hong, Jae-Young, et al., "Design and Implementation of the System Provide of the Loyalty Service for Electronic Commerce", Journal of KISS: Computing Practices, vol. 6, No. 3, Jun. 2000, pp. 348-355.

Leinwand, A., "A Distributed-Star Overnet for Global Business Applications", IEEE Globecom, Nov. 8-12, 1998, vol. 2, 1998, pp. 1291-1296.

Munger, S., "Leveraging New Technology to Build Brand Loyalty", Direct Marketing, vol. 59, No. 8, Dec. 1996, pp. 58-60.

Hamstra, Mark, "MemberWorks Invests $50 Million to Move Club Business to the Internet Annotated Title-MemberWorks Inc. to Invest Over $50 Mil in Next 6 Quarters to Shift Much of its Membership-club Business to the Internet", DM News, vol. 22, No. 10, Mar. 13, 2000, p. 34.

"MyPoints Signs Two Promotions Pacts", DM News, vol. 21, No. 46, Dec. 13, 1999, p. 1.

Beardi, Cara, "Carlson Brings Loyalty Program to the Internet", Advertising Age, vol. 71, No. 36, Aug. 28, 2000, p. 33.

Goldie-Scot, Duncan, "MasterCard Turns Beenz into Money—A new Reward Card is to be Launched", Financial News, May 15, 2000.

Hein, Kenneth, "FunnyMoney.com Enters the Loyalty Points Arena", iMarketing News, vol. 2, No. 17, May 1, 2000, p. 35.

Hein, Kenneth, "Shakeout Begins in Loyalty Points Arena", iMarketing News, vol. 2, No. 16, Apr. 24, 2000, p. 6.

Hein, Kenneth, "Online Loyalty Points Provider Makes Move Offline", iMarketing News, vol. 2, No. 9, Mar. 6, 2000.

Hein, Kenneth, "Sportcut.com Pays eBucks for Visits", iMarketing News, vol. 2, No. 1, Jan. 10, 2000, p. 12.

Judge, Debra, "Loyal to a Point", Internet World, Dec. 1, 1999.

(56) References Cited

OTHER PUBLICATIONS

Briody, Dan, "Web Currencies Give Cash a Run for its Money", InfoWorld, vol. 22, No. 16, Apr. 17, 2000, p. 32.
Oberndorf, Shannon, "Points for Loyalty", Catalog Age, vol. 14, No. 13, Dec. 1997, pp. 35, 38.
Neel, K.C., "CNN Piles on the Miles", Cable World, col. 12, No. 44, Oct. 30, 2000, p. 32.
"Developing Payments Loyalty", Electronic Payments International, Oct. 31, 1999, p. 13.
"U.S. Loyalty Programs Goes Online With British Telecom", Euromarketing via E-mail, vol. III, No. 7, Nov. 12, 1999.
"Netcentives (NNM:NCNT)", The IPO Reporter, Nov. 15, 1999.
"Compubank Gives Miles", Customer Loyalty Today, Nov. 1999, p. 5.
"Netcentive Network", Customer Loyalty Today, vol. 6, No. 6, Jun. 1999, p. 6.
Turcsik, Richard, "Up, Up and Away", Brandmarketing, vol. VI, No. 4, May, 1999, p. 46.
"Internet Marketing Concepts Patented", San Jose Mercury News, Aug. 27, 1998.
"Wells Fargo Joins Internet Sales Program", American Banker, vol. CLXII, No. 194, Oct. 8, 1997, p. 21.
"Web Incentive Program Wins Clout with Airline Alliances", Advertising Age, vol. 68, No. 39, Sep. 29, 1997, p. 43.
"Net Surfers Rack Up Travel Miles", USA Today, vol. 16, No. 11, Sep. 29, 1997, p. 1B.
"Firm Adds Momentum for Click-And-Brick Loyalty", Bank Network News, vol. 18, No. 22, Apr. 13, 2000, p. 5.
"Netcentives Powers Latin American Loyalty Network", PR Newswire, Sep. 13, 2000.
"Netcentives Goes Universal", San Francisco, Business Times, vol. 14, No. 32, Mar. 10, 2000, p. 10.
"Netcentives Professional Services (NPS) Develops Customer Relationship Management System for Insurance Marketing Group", PR Newswire, Dec. 29, 1999, p. 2235.
U.S. Appl. No. 09/218,019, filed Dec. 22, 1998, Klayh.
U.S. Appl. No. 09/677,401, filed Sep. 29, 2000, Kern, et al.
U.S. Appl. No. 09/272,153, filed Mar. 19, 1999, De Rafael, et al.
U.S. Appl. No. 09/234,889, filed Jan. 21, 1999, Kawan.
U.S. Appl. No. 09/165,457, filed Oct. 2, 1998, O'Flaherty.

* cited by examiner

FIG. 6H

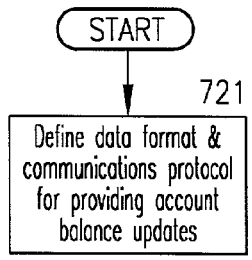
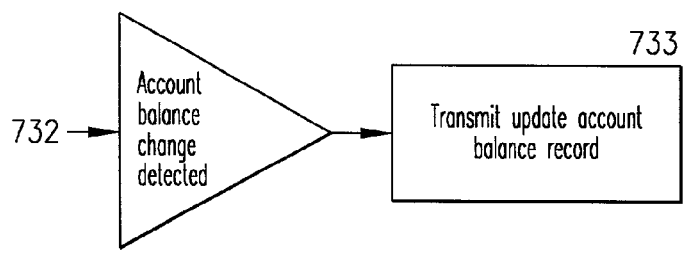
FIG. 7C
FIG. 7D
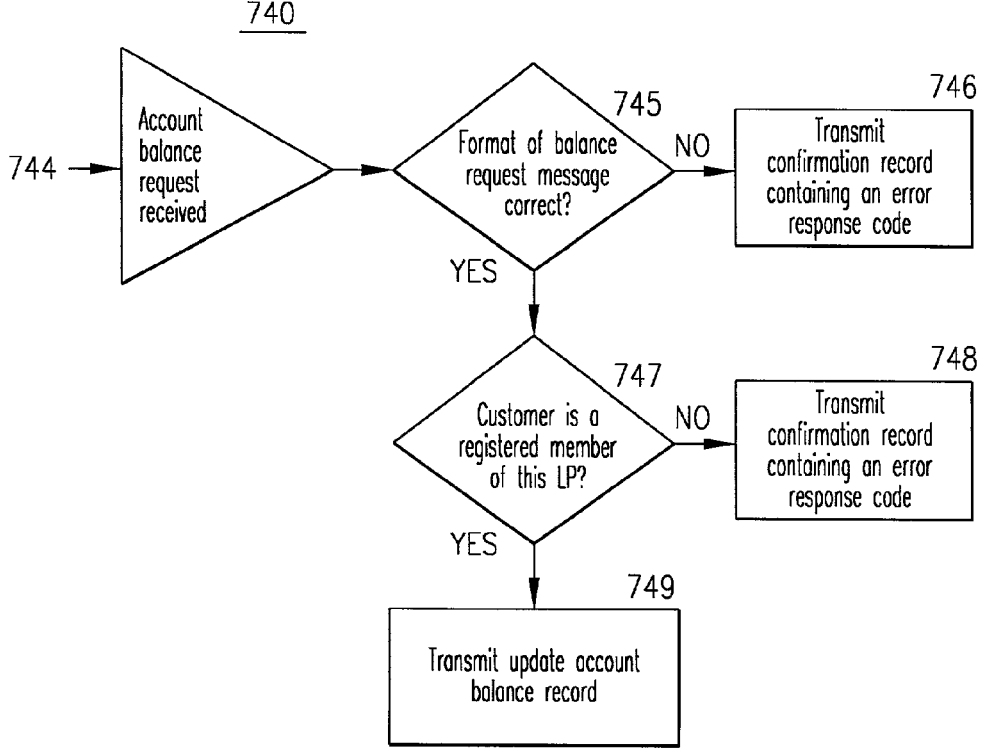
FIG. 7E

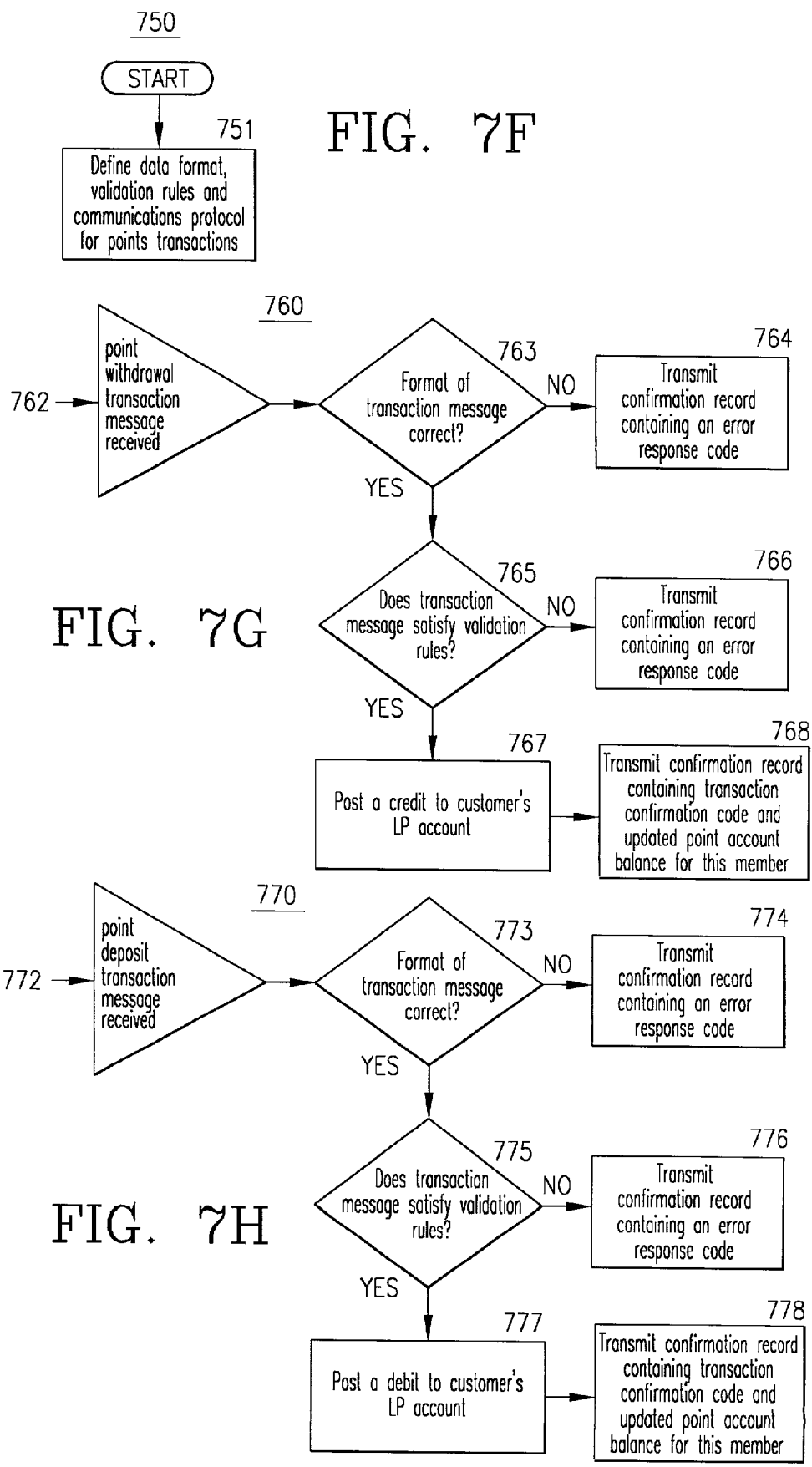

APPARATUS AND METHOD OF FACILITATING THE EXCHANGE OF POINTS BETWEEN SELECTED ENTITIES

FIELD OF THE INVENTION

This invention relates to apparatus and methods for keeping track of points and, in particular, for managing and exchanging those points that are issued and redeemed in the context of a loyalty program (LP).

BACKGROUND OF THE INVENTION

This invention has in at least one embodiment an application to loyalty programs (LPs). LPs are designed as the name suggests is to create and maintain the loyalty of a customer to a particular product or service. The source of such services and/or products is also the issuer or distributor of the points to its customers and the redeemer of those points for rewards. LPs are based on the concept of influencing the customer to continue to purchase products and/or services from one source, whereby the customer is repetitively issued points and, over a period of time, will accumulate sufficient points that may be redeemed for a valuable reward.

There are now over 5 trillion LP points outstanding around the world. Annually 500 billion new points are issued. Each of these points represents real economic value to both the customer and the issuer. LP's which issue points must carry them on their balance sheets as a contingent liability (for example, Business Week has reported that in American Airlines' case this number is greater than $800 million). In some cases, LPs are also using points as a revenue-generating product that LP proprieters sell to marketing partners. There are four main types of loyalty programs: travel (airlines and hotels), financial (credit cards), retail and network (AirMiles, ClickRewards and WebMiles).

The number of LPs has exploded in recent years, thus making it difficult for customers to be knowledgeable about the plans, much less interested in participating in a LP. Presently there are over 90 LPs sponsored by the airlines, i.e., frequent flyer programs. There are hundreds of credit card programs sponsored by financial institutions. There are over 8500 LPs sponsored by retail companies. The number of customers who have participated in LPs is greater than 350 million. Globally, there are more than 200 million customers participating in frequent flyer LPs, of which 160 million customers participate in LPs sponsored by US airlines. 75% of the UK population carry a loyalty card, while 66% of Canadian households belong to LPs of AirMiles or Sears Club.

The issued points that have not been redeemed has now grown to staggering numbers. There are presently 3.5 trillion points in the market today in the North American LPs alone. 500 Billion new points are generated annually in frequent flyer LPs alone. Each point has an economic value, which can be expressed in monetary units per point. Accumulated in the numbers mentioned above, unredeemed points represent huge assets. In addition, unredeemed points represent a liability to the issuing entity in terms of the future cost to redeem these points. While presenting a liability to the point issuers, they also represent a huge asset base, which is growing annually, as most LPs are accruing more points each year than their customers are redeeming. This positive issue/redeem ratio is expected to continue in the future. Thus while the liability of many LP point issuers has increased, also has been the opportunity of generating revenue streams for many of the larger LPs. Presently, such large issuers have income from the sale of points to their existing customers, but also to other business entities.

LP points typically have a limited life from their date of issuance. Thus, many points will expire as a result of a lack of interest in participating in a LP plan. In 1998, 68 billion points expired. The lack of interest and participation results in part from the number of available plans, the complexity of a particular plan, the inability to readily ascertain the balances in the LPs to which a customer may belong and the relatively small value of the points. There are billions of points that sit in accounts with very limited redemption options and low utility to a customer, i.e., the points are kept in accounts with balance that are below redemption levels, or a levels with limited redemption options. The growing number of LPs have led customer to join a number of LPs, thus spreading the points issued to this customer among the many programs and preventing any one of these plans from accumulating a significant number of points. For the above reason, few customers are achieving significant value from the LPs thereby preventing a LP from meeting its goal of achieving customer loyalty to a particular source of products and/or services.

There are presently available a number web sites that offer services related to LP programs. MaxMiles MileageMiner is a website offering management services to frequent flyers. MaxMiles automatically gathers frequent flyer balances and account information from airlines, hotels, and credit cards, analyzes the most current mileage offers, searches for missing mileage credits, and sends a personalized report of all miles via email to the frequent flyer. The personalized reports are updated daily.

Miles Direct.com is a website that automatically gathers and reports all of your frequency and rewards balances from airlines, hotels, credit cards into one consolidated statement. Miles direct also tracks expiring miles or points, activity, and elite levels.

Points Universe is a website that keeps track of points, miles and other currencies in one statement. A customer can also earn points, award points, and join a points universe loyalty program. By shopping/visiting sites, these points can be used to redeem products on the Awards Store Catalogue. The AwardMaximizer tool tells you what products can be purchased with your Award Points.

Milesandpoints.com is a web service that keeps track of your miles and points in one location. The site alerts you about new promotions and offers based on your preferences. The site also reminds its customers when promotions/miles/points are about to expire.

MilePoint.com is a website service that converts any or all of its customers' miles and points from participating frequent traveler programs into money to spend at an assortment of online merchants. Every mile point is valued at a set rate. For example, if you have 500 miles and the set rate is 0.02/mile, a customer's points may be converted in a currency, e.g. $10. MilePoint Money is used for partial payment of purchases with merchants within the MilePoint network. In addition, Mile Point permits its customers to set up accounts and to add selected LPs to its portfolio. The MilePoint website is issuered with its LPs.

The Netcentives website provides relationship marketing technologies and services creating loyalty programs for brick-and-mortar, click-and-mortar, and pure-play online companies to maximize the value of their relationships with its customers, employees and business issuers. Netcentives creates private label rewards for its clients or can have it's clients participate in ClickRewards.

None of the above described services or web sites recognize much less address the primary problem with LPs, namely that most customers do not accumulate sufficient numbers of points at which the customers can effect redemption's for the rewards. In particular, these services do not teach how points may be accumulated into one account. In addition, the above described websites do not disclose how to efficiently communicate with selected LPs, as well as to manage the liability created by the unredeemed points and, additionally, to generate new and enhance steams of revenue.

SUMMARY

It is an object of this invention to enhance the effectiveness of LPs.

It is a further object of this invention to render LPs more attractive to point customers by giving those point customers greater access to the rewards of their LP.

It is a more particular object of this invention to enhance the customer's use of a LP to accumulate more points.

It is a still further object of this invention to enable a customer to convert points of one LP into points issued by a different LP.

It is another object of this invention to enroll in a number of LPs and to keep track of the points accumulated in each LP in which the customer has enrolled.

It is a still further object of this invention to permit point issuers to participate in a system wherein customers can enroll with the permission of the issuers of their programs.

It is another object of this invention to establish a system for permitting the exchange of points between LPs sponsored by corresponding point issuers and to give control over of the operation of each of the LPs to its points issuer.

It is a still further object of this invention to establish a system for facilitating users to exchange points between LPs and to permit each participating point issuer to set the point exchange rates of its LP.

It is another object of this invention to keep track of the points deposited and withdrawn from LPs as a result of the transfer of points between the LPs and to reconcile the LPs as to the points deposited in or withdrawn from that LP.

In accordance with these and other objects of the invention, there is disclosed a system and method of exchanging first points held by a customer for second points, wherein the first points that are issued by a first point issuer differ from the second points that are issued by a second point issuer. This method comprises the steps of permitting the customer to set a first number of first points to be exchanged and permitting the first and second point issuers to set the point withdrawal and deposit rates of their first and second points respectively. Next, an equivalent number of the second points is determined based upon the point withdrawal and deposit rates of the first and second point issuers respectively, and the first number of the first points. Then, the first number of points is exchanged for a second equivalent number of second points.

In a further aspect of the invention, there is described a method of permissioning a customer to enroll in a selected one or more of a plurality of point programs, each point program being controlled by its point issuer. The permissioning method comprises the steps of facilitating the customer to select at least one point program of the plurality in which to be enrolled, to enter predetermined information about the customer, and to permit at least one point issuer to set its own criteria for customer enrollment. Finally, the customer's information is compared with the enrollment criteria and, if there is a match, permissioning the customer to enroll in the selected one point program.

In a still further aspect of this invention, a method is described for facilitating a customer to enroll in selected ones of a plurality of point programs and to keep track of the number of points held by the customer in each point program in which the customer has enrolled. This method comprises the steps of maintaining a customer's file with a list of the IDs of the point programs in which the customer has enrolled, and facilitating the customer to enroll in another point program. Upon enrolling in the other point program, the ID of the other point program is added to the customer's file, and another point program file is created for the customer to retain its balance of points of the other point program. Finally, the point balance of the other point program is added from the point program file to the customer's file.

In another aspect of this invention, a system including a transaction center is described for enabling a customer to enroll and keep track of its points issued by selected ones of a plurality of point programs in which the customer has enrolled. Each point program is managed by a corresponding terminal, which includes a terminal database and a terminal server which is programmed to accumulate the balances of points for customers to which points are issued by the terminal's point program. The transaction center comprises a center input, a center database and a center server. The center server is programmed to enable the customer to apply via the center input information about the customer, enroll the customer in selected ones of the point programs, and create a record for each enrolled customer to be stored in the center database. The customer's record comprises a first file for the information inputted by the customer, and a second file for storing the balances of the points accumulated by the customer from the points programs in which the customer has enrolled.

In another feature of this invention, there is described a method of exchanging first points that are issued by a first point issuer for second, different points that are issued by a second point issuer at exchange rates set by the first and second point issuers respectively. The exchange method comprises the steps of facilitating the entry of first and second exchange rates by the first and second point issuers respectively, facilitating the entry of a customer's order for exchanging first points for second points, and determining the presence or absence of each of the first and second exchange rates. Finally, the exchange of points is blocked in absence of either of the first or second exchange rates. In a more specific aspect of this invention, the absence of the exchange rates for the selected one point program is detected, whereby a blocking signal is transmitted to the transaction center, which is programmed to respond to the blocking signal to prevent the transmission of the command.

In another aspect of this invention, a method of enabling first and second points issuers is described that respectively issue first and second points to validate an exchange of the first points held by a customer for the second points. This method comprises the steps of facilitating the first and second point issuers to enter their first and second criteria respectively, facilitating the entry of a customer's order to exchange its first points for the second points, and generating a first transaction message to withdraw the first points from the first point issuer. Then, the first transaction message is compared with the first criteria. If the first transaction message satisfies the first criteria, a second transaction message is generated to deposit the second points in the second point issuer. Then, the second transaction message is compared with the second criteria. If the second transaction message satisfies the second criteria, the exchange of the first points for the second points is validated.

In a still further aspect of this invention, there is described a system which enables a plurality of potential customers to be validated for communication with selected ones of a plurality of loyalty programs. Each program has a criteria for validating the potential customer for communication therewith. The customer validation system comprises a plurality of terminals, each of which comprises a terminal database, and a terminal server, and a transaction center, which includes a center input, a center database and a center server. The transaction center is connected to each of the terminals by a data transmission path. The center database store the validating criteria for each of the plurality of loyalty programs. The center computer is programmed to facilitate the input of a request from a potential customer to communicate with at least a selected one of the plurality of loyalty programs, respond to the customer's request by constructing a customer's validation record in accordance with the criteria of the selected one loyalty program, and transmit the customer's validation record to the terminal associated with the selected one loyalty program. Each terminal server is programmed to receive and to compare the customer's validation record with the criteria of its selected one loyalty program and, if there is a satisfactory match, validate this customer for communication with the selected one loyalty program.

BRIEF DESCRIPTION OF THE DRAWINGS

Many details and advantages of the present invention will be apparent to those skilled in the art when this document is read in conjunction with the attached drawings where matching reference numbers are applied to the matching elements and where:

FIGS. 6A-I illustrate a plurality of web pages generated by the web server of the transaction center shown in FIGS. 1 and 2 to implement the various steps of the flow diagram of FIGS. 5A and B;

DESCRIPTION OF THE PREFERRED EMBODIMENT OF THIS INVENTION

Figure 1:
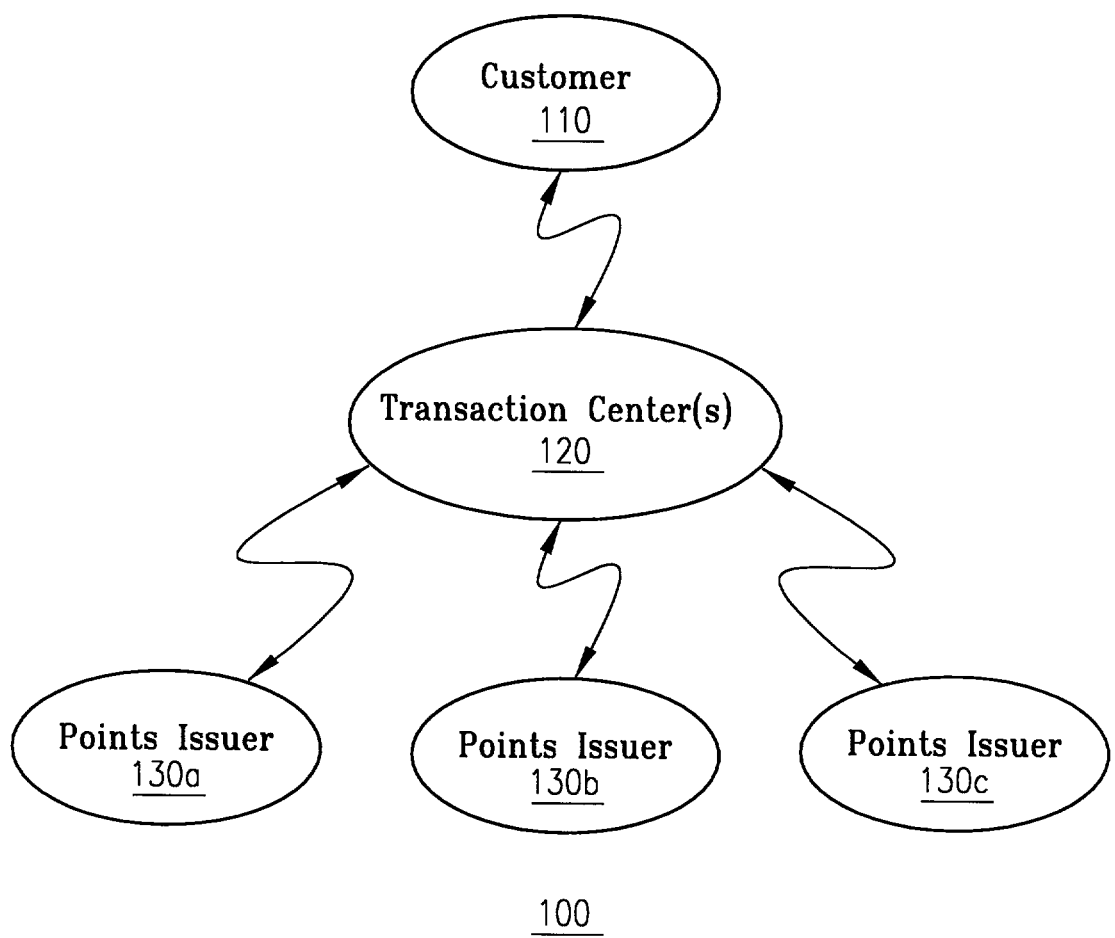
FIGS. 1 and 2 are respectively a general and a detailed functional block diagram of a system in accordance with the teachings of this invention to permit customers to transmit over the Internet to a transaction center messages ordering the transfer of the customer's points, to execute upon the order of a customers an exchange of points from the customer's account in a withdrawing loyalty program's (LP) server to the customer's account in a depositing LP's server, and to determine the number of a first kind of points to be deposited in the depositing LP's server dependent on the number of points of a second kind removed from the withdrawing LP's server and a point withdrawal rate of the first kind of points and a point deposit rate of the second kind of points.

Referring now to the drawings and in particular to FIG. 1, there is shown a functional block diagram of a preferred embodiment of a point management system 100, which facilitates interaction between a customer 110, a transaction center 120 and a plurality of points issuers 130a-c. FIG. 1 illustrates one embodiment for the online points management system 100. In one embodiment, the points management system 100 is implemented as an Internet points management system. In general, the points management system 100 involves three types of entities: a customer 110, a transaction center 120, and plurality of points issuers 130a-c. For purposes of simplicity, FIG. 1 illustrates the system 100 as it relates to a single customer; however, the points management system 100 typically supports many customers 100 and points issuers 130 and may involve multiple transaction centers 120. For purposes of explanation, a customer 110 is any entity that holds points in one or more Loyalty Programs ("LPs"). A transaction center 120 refers to an entity capable of interacting with customers and points issuers to provide the points management capabilities described below. In a preferred embodiment, this may take the form of a collection of computer hardware and software. A point issuer 130 ("issuer") is any entity that controls the disposition and distribution of a currency. In a preferred embodiment, the point issuer operates a Loyalty Program that controls a private currency of points. The points managed by the system 100 may take the form of a variety of Loyalty Program ("LP") points such as those issued by airlines, hotels, financial entities, e.g., credit cards, and networks, e.g., portal web sites on the Internet. In deed, the points may not be related at all to LPs, but rather the points may represent the monetary currencies of different countries, and other units of value as would be recognized by those skilled in the art.

In an illustrative embodiment of this invention, the points are used in the context of a LP, wherein there are a plurality of different kinds of points, each kind issued by a different LP of the point management system 100. Typically, each kind of point is issued and redeemed by a different LP and may have a different value or liability to its LP. For example, when a LP issues points, a liability is created for the each unredeemed point, expressed in terms of the amount of a particular currency per point. The unredeemed points represent a liability to its LP. As will be explained below, the point management system 100 of this invention permits a customer to effect an exchange of points from one LP to another. For example, a customer may exchange points issued by American Airlines for those issued by the American Express Card. Alternatively, the customer may transfer points issued by any number of LPs to a single LP, whereby the customer may redeem its collected points for the rewards offered by the single LP.

In general, the customer 110 ascertains its current points balances and requests points exchanges between issuers 130*a-c* by interacting with the transaction center 120. In a preferred embodiment, the communications to support this interaction occur over the open Internet.

In general, the transaction center 120, operates as a "web portal" for the customers 110 through which they may view their current points balances for each issuer 130 and request the exchange of points between issuers 130*a-c*. The transaction center 120 acts as a "currency exchange" for the issuers 130*a-c*, effecting the exchange of points from one issuer to another.

In general, each issuer 130, operates a LP which maintains points balances for each customer that belongs to that LP. In addition, the issuer provides a mechanism by which points can be deposited or withdrawn from customers accounts, thereby effecting a points exchange. As above, the "Z"-shaped double-headed arrows, shown on FIG. 1, denote bi-directional communication over the Internet. Although the issuer interaction with the transaction center 120 is described in conjunction with secure communication over the Internet, any form of communication, such as a direct telephone line connection, may be used without deviating from the spirit and scope of this invention.

Figure 2:
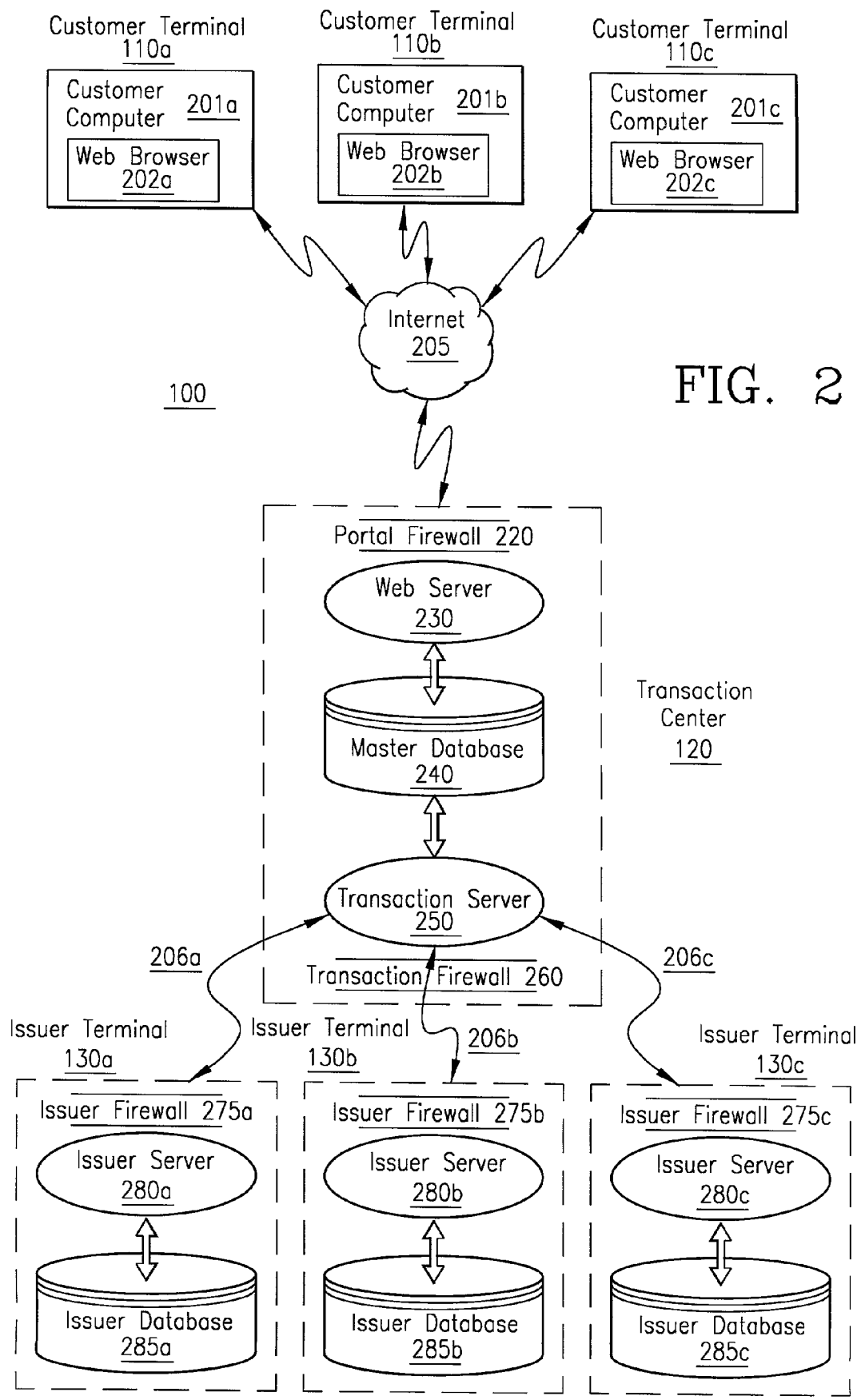

FIG. 2 illustrates a more detailed embodiment of the points management system 100, which includes a plurality of the customer terminals 110*a-c*, a data transmission medium which in one illustrative embodiment of this invention comprises the Internet 205, the transaction center 120, and a plurality of the issuer terminals 130*a-c*, each of which is attached to the transaction center 120 by a corresponding data transmission path 206*a-c*. The customer carries out point exchanges by use of its customer terminal 110, which includes a customer computer 201 and a web browser 202. The customer "surfs" to a web site provided by the transaction center 120. Upon prompting, the customer enters the following data into the website: 1) information about itself and 2) data identifying each of the issuer LPs from which points are to be withdrawn, each of the issuer LPs to which points are to be deposited, and the number of points to be withdrawn from each of the withdrawing LPs. This data is transmitted over the Internet 205 to the transaction center 120, where the transmitted data is processed as will be described below.

In this illustrative embodiment as shown in FIG. 2, the transaction center 120 comprises a portal firewall 220, a web server 230, a master database 240, a transaction server 250 and a transaction firewall 260. The portal firewall 220 provides protection to the transaction center 120 from the public Internet 205, while permitting customers 110 to connect to the web server 230. The web server 230 provides a "web portal" interface for customers to track their points balances as maintained by the issuers in their terminals 130*a-c* and to effect point exchanges between their designated LPs. In particular, the web server 230 is programmed to establish a web site, to which the web browser 202 may log on and enter data in response to web pages that are downloaded from the web server 230 to the web browser—202. As described in detail below, the master database 240, maintains a profile of each customer called a customer portfolio. Each customer portfolio includes identification, current LP points balances and a record of points exchanges for that customer. The web server 230 utilizes this profile to permit the customer 110 to login to the web site, to display point balances and to permit points exchange requests. In one illustrative embodiment, the web server 230 is coupled to the master database 240 via a local area network (LAN), as indicated by the wide double-headed arrow. The transaction server 250 is illustratively coupled to the master database 240 in a similar fashion. The transaction server 250 connects to each of the issuer terminals 130*a-c* via the secure data transmission line 206*a-c*. In one illustrative embodiment this line 206 is a virtual private network (VPN) running over the public Internet. It also may manifest as a direct electronic link such as a telephone line or packet switched network. The specific method of data transmission is unique to each connection between the transaction server and a issuer terminal. As described in detail below, the transaction server 250 utilizes the customer portfolio information stored in the master database 240 to conduct points exchanges between a plurality of issuers, upon request of the customer. The transaction server 250 also extracts current points balances for the customer from each issuer terminal 130*a-c*. The transaction firewall 260 protects the transaction center 120 from attack via any of the data transmission lines 206*a-c* connected to the issuer terminals 130*a-c*. In one illustrative embodiment, it also provides encryption of all data passing between the transaction server 250 and the issuer terminals 130*a-c*.

In one illustrative embodiment, each issuer terminal 130*a-c* presides in a facility controlled by the issuer and is part of the system that manages that LP. (For purposes of simplification, the designator "130" will imply the plurality of issuer terminals and their contained components, e.g. 130*a-c*.) Each of the issuer terminals 130 includes an issuer firewall 275, a issuer server 280 and a issuer database 285. The issuer firewall 275 provides protection to the issuer terminal 130 from outside attack. As will be explained below, communication between the issuer terminals 130 and the transaction server 250 permits the issuer server 280 to repetitively download a current points balance from the issuer database 285 to the master database 240, thereby facilitating the customer access to the current points balances of its LP accounts. Utilizing protocols described below, the transaction server 250 may also request an issuer terminal 130 to deposit or withdraw points from a specified customer's LP account, thus effecting a points exchange.

Figure 3:
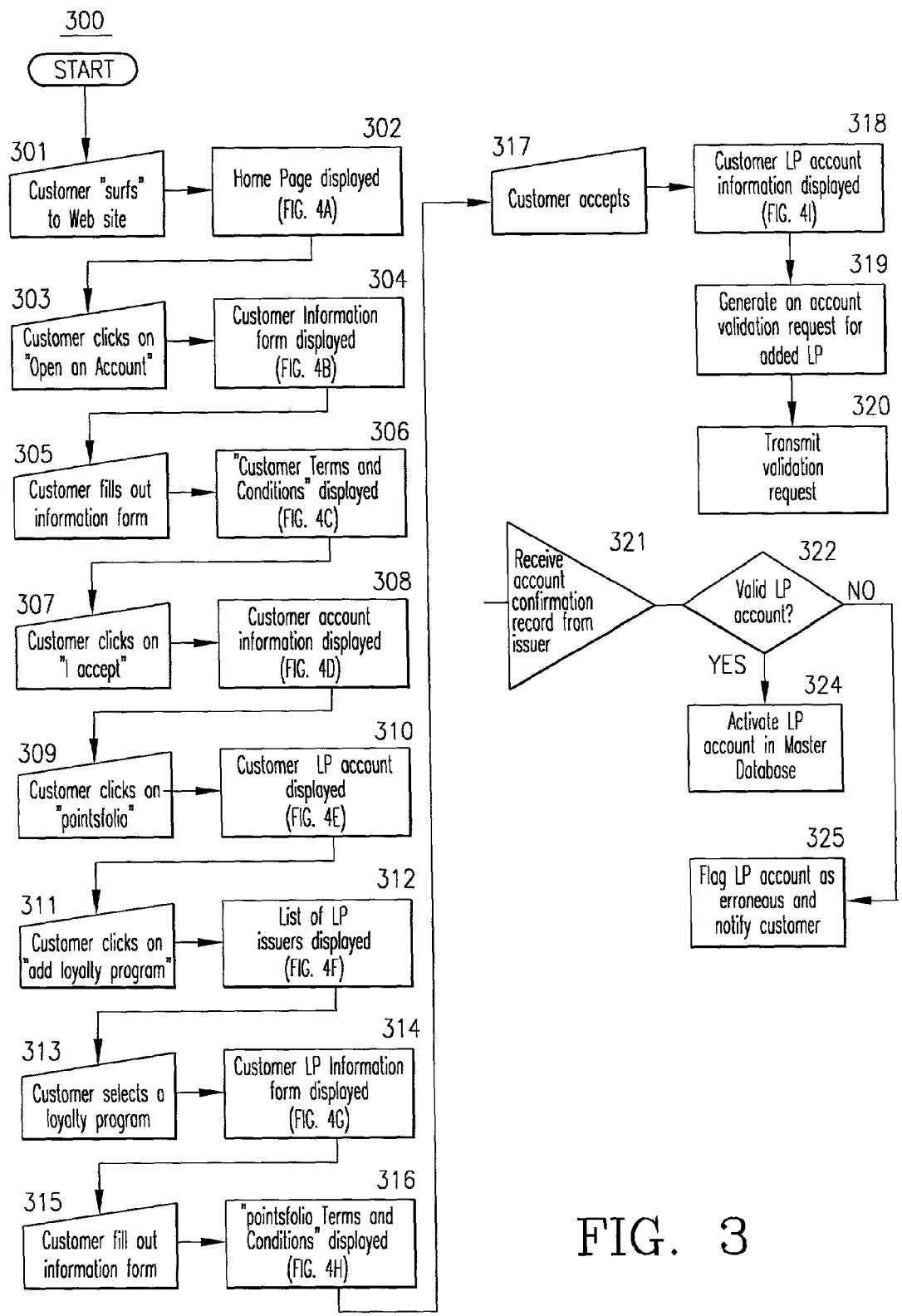
FIG. 3 is a flow diagram of a process carried out by the execution of a program stored in a master database of the transaction center shown in FIGS. 1 and 2 for opening a customer's account in the transaction center, entering customer information into its transaction center account, adding the LPs of the point issuers to the customer's transaction center account, and validating the customer's information sent to the added LP(s)

In order for a customer to utilize the points management system 100, it must first establish a customer portfolio within the transaction center 120 and provide detailed profile information regarding itself and the issuer LPs to which it is a member. This will ensure that sufficient identification is necessary to access the points management system 100 (via the website) and to inhibit fraudulent use of the customer's LP accounts. Referring now to FIG. 3, there is shown a flow diagram representing the process of a program 300 that is executed by the web server 230 to present a series of web pages as shown in FIG. 4A-I. This program 300 is designed to facilitate the opening of a customer portfolio at the transaction center 120, to enter customer profile information, to establish a list of LPs that the customer is a member and to facilitate the validation of that list by sets of rules established by the issuers for their respective LPs and stored in their databases 285. This validation process is critical to meet the security requirements of the points management system 100 and specifically the issuers 130. By enabling each issuer 130 to validate customers that wish to exchange points from the issuer's LP, the issuer can control which customers are deemed fit to do so. In an illustrative embodiment, only customers 110 that can provide sufficient identification regarding their LP account with that issuer would be validated for points exchange. In particular, the issuer determines the nature and number of the identification elements that the customer must provide to the user, so that the user is satisfied that the individual entering the data is in fact the identified customer. In an example of a completed customer identification that would satisfy the issuer, the customer must provide their full proper name, complete mailing address, LP member ID and, in most cases, a PIN or password. This information is validated against the issuer's database 285 to determine if the customer in question is properly representing themselves.

Figure 4A:
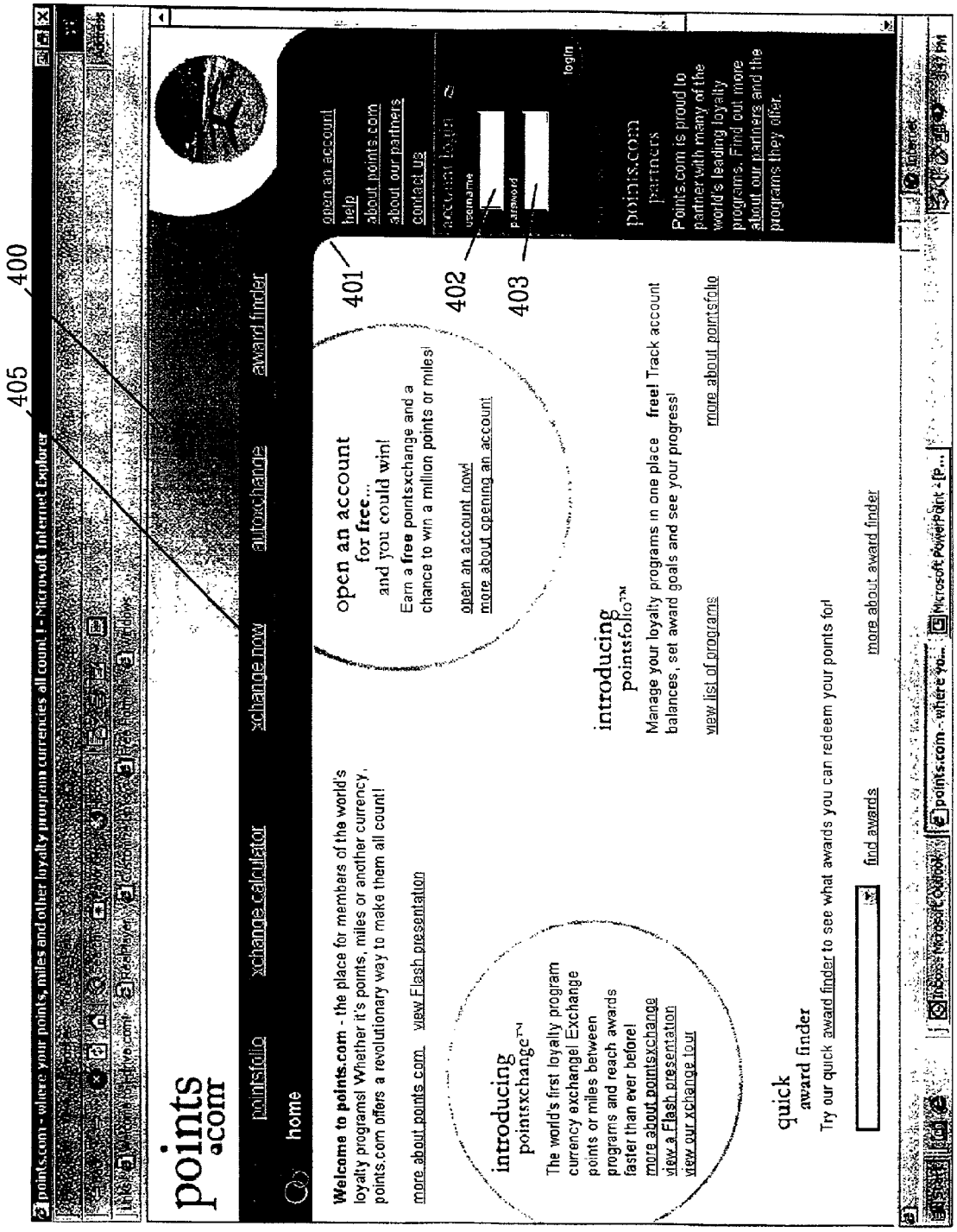
FIGS. 4A-I illustrate a plurality of web pages generated by a web server of the transaction center shown in FIGS. 1 and 2 to implement the various steps of the flow diagram of FIG. 3.

Initially in step 301, the customer using his web browser 202 "surfs" to the points management system web site. The web server 230 displays in step 302 a home web page 400, as shown in FIG. 4A. The web page 400 provides the customer with information about their LP accounts, which are kept in the master database 240 of the transaction center 120. This customer portfolio, illustratively called the "pointsfolio", contains detailed information about each LP that the customer is a member and tracks current points balances for each LP. In step 303, the new customer may click on the "open an account" button 401 to permit the customer to create a portfolio at the transaction center 120. After a customer has opened its account and selected its username and password, the customer must log into its transaction center account by entering in step 305 its username and password into the Boxes 402 and 403, respectively.

Figure 4B:
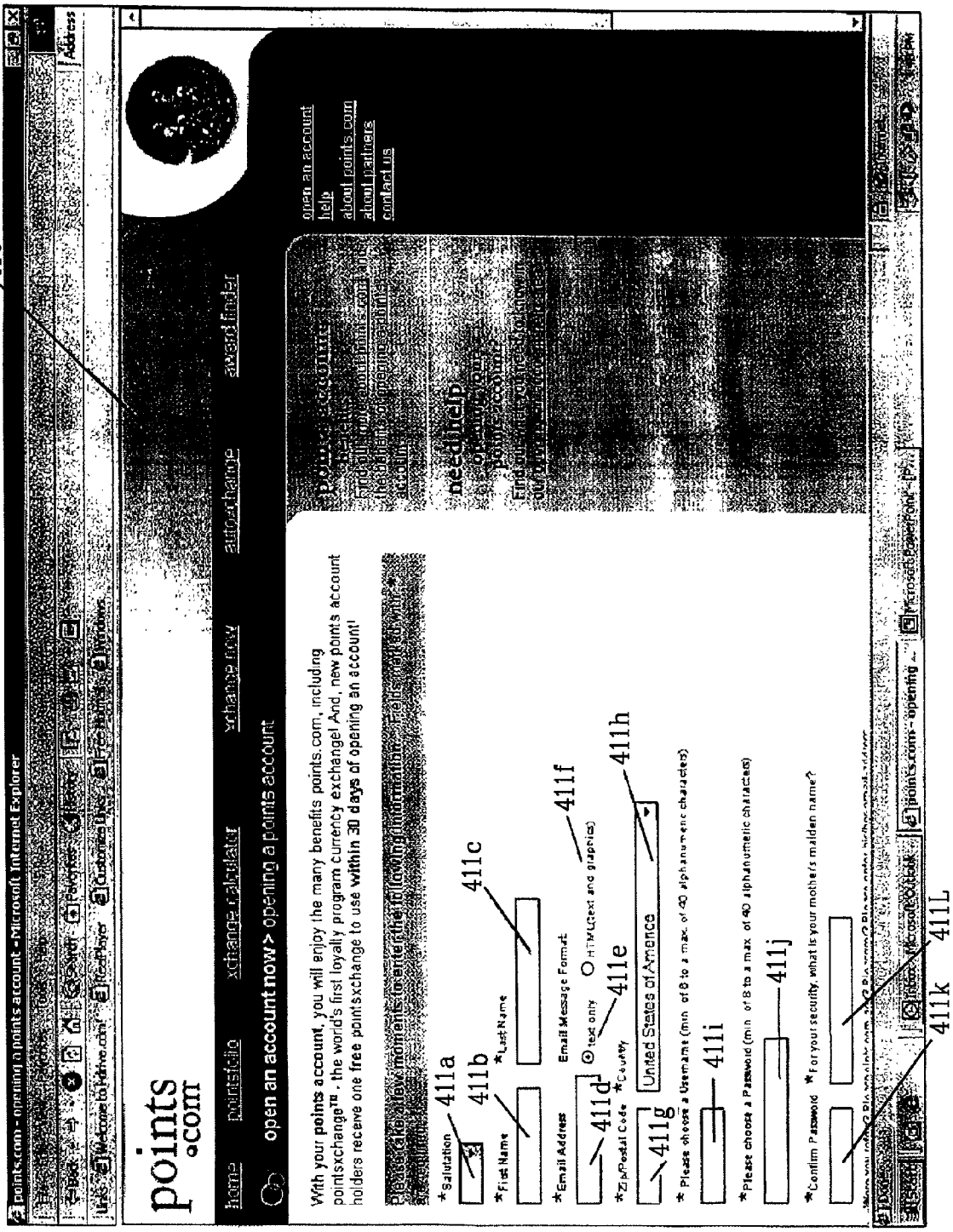
Figure 4C:
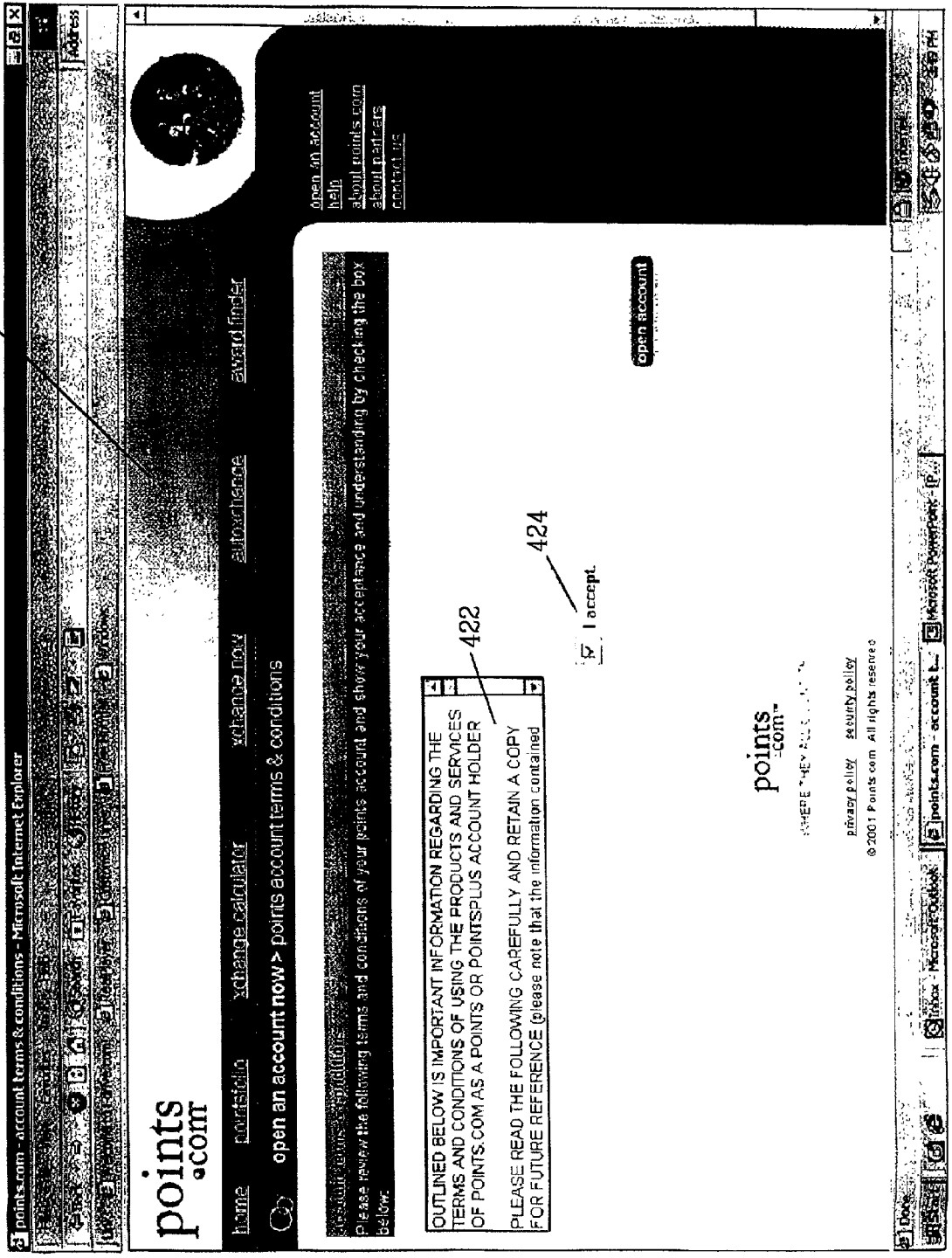
Figure 4D:
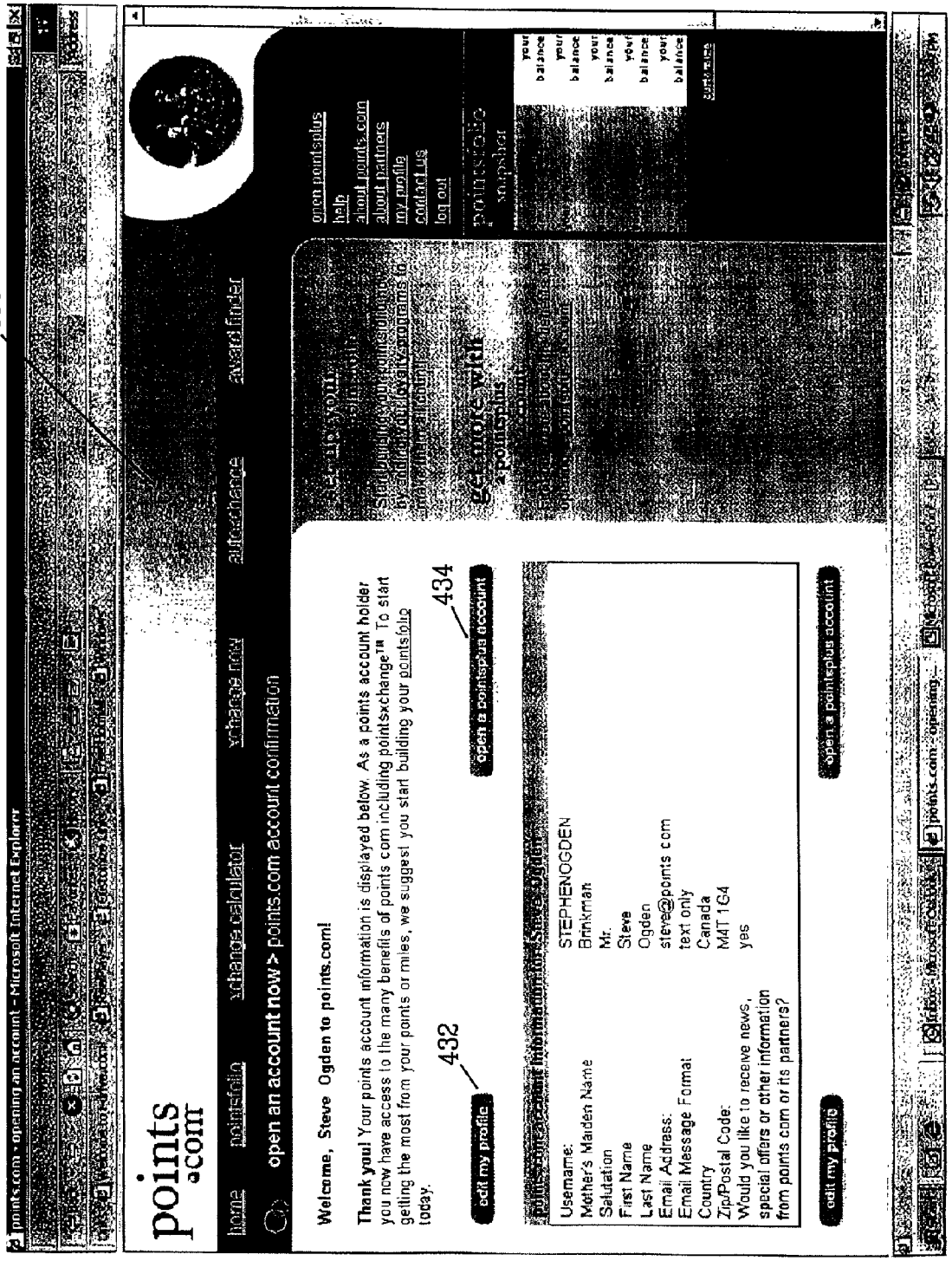
Figure 4E:
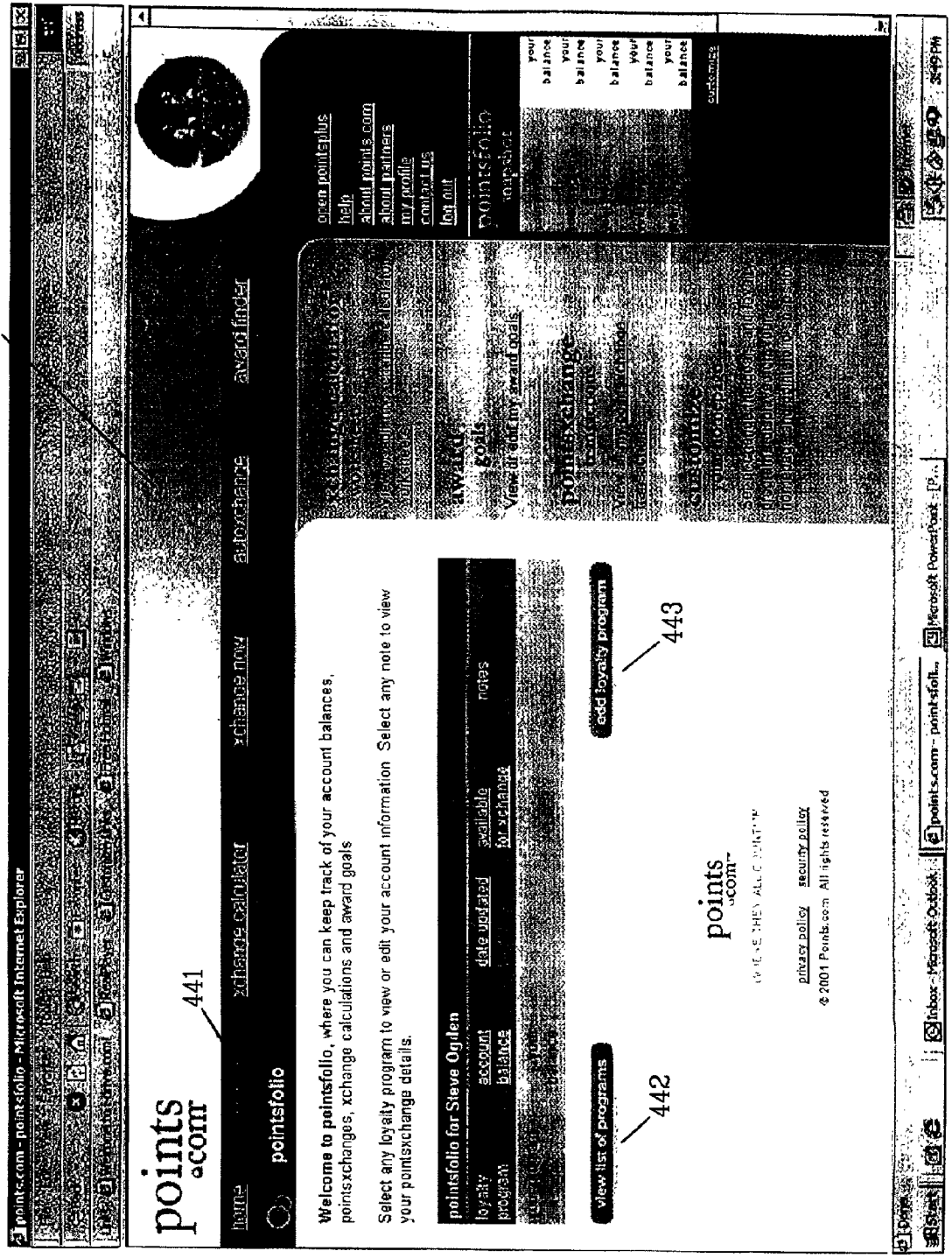
Figure 4F:
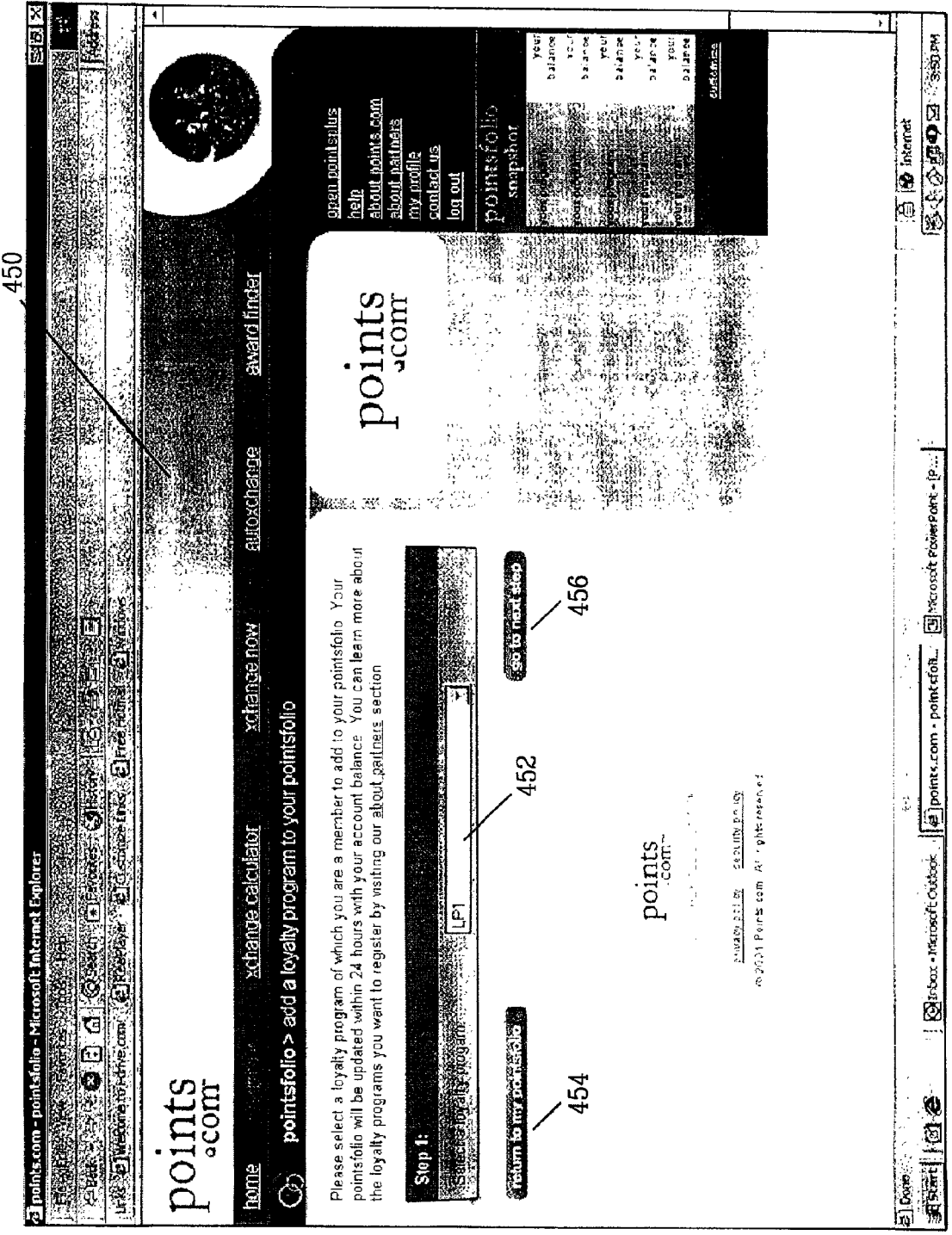

Once the "open an account" button 401 has been clicked, step 304 displays the web page 410 as shown in FIG. 4B, whereby the customer may enter in step 305, its contact information, e.g., its name, Email address, ZIP code and country of residence, its username and password, in boxes 411a-l. After the customer data has been entered into the transaction center 120 and a customer account is established in the master database 240, step 306 displays a web page 420 that as shown in FIG. 4C sets out the conditions set by the transaction center 120 for creating a customer account and provides an acceptance box 424. Upon clicking on the box 424 in step 307, step 308 displays a web page 430 which sets out as shown in FIG. 4D the entered customer information and permits the customer to edit and revise that information. If the customer information is satisfactory, the customer is given the opportunity to add to their portfolio, their customer accounts in LPs maintained by issuers in their terminals 130. By clicking in step 309 on the "pointsfolio" link 441, step 310 displays a page 440 that shows as seen in FIG. 4E a consolidated view of all of the customer's LP accounts including point balances. When the customer in step 311 clicks on the "add loyalty program" button 443, step 312 displays a web page 450 that as shown in FIG. 4F includes a selection box 452 for permitting the customer to add in step 313 another LP.

Figure 4G:
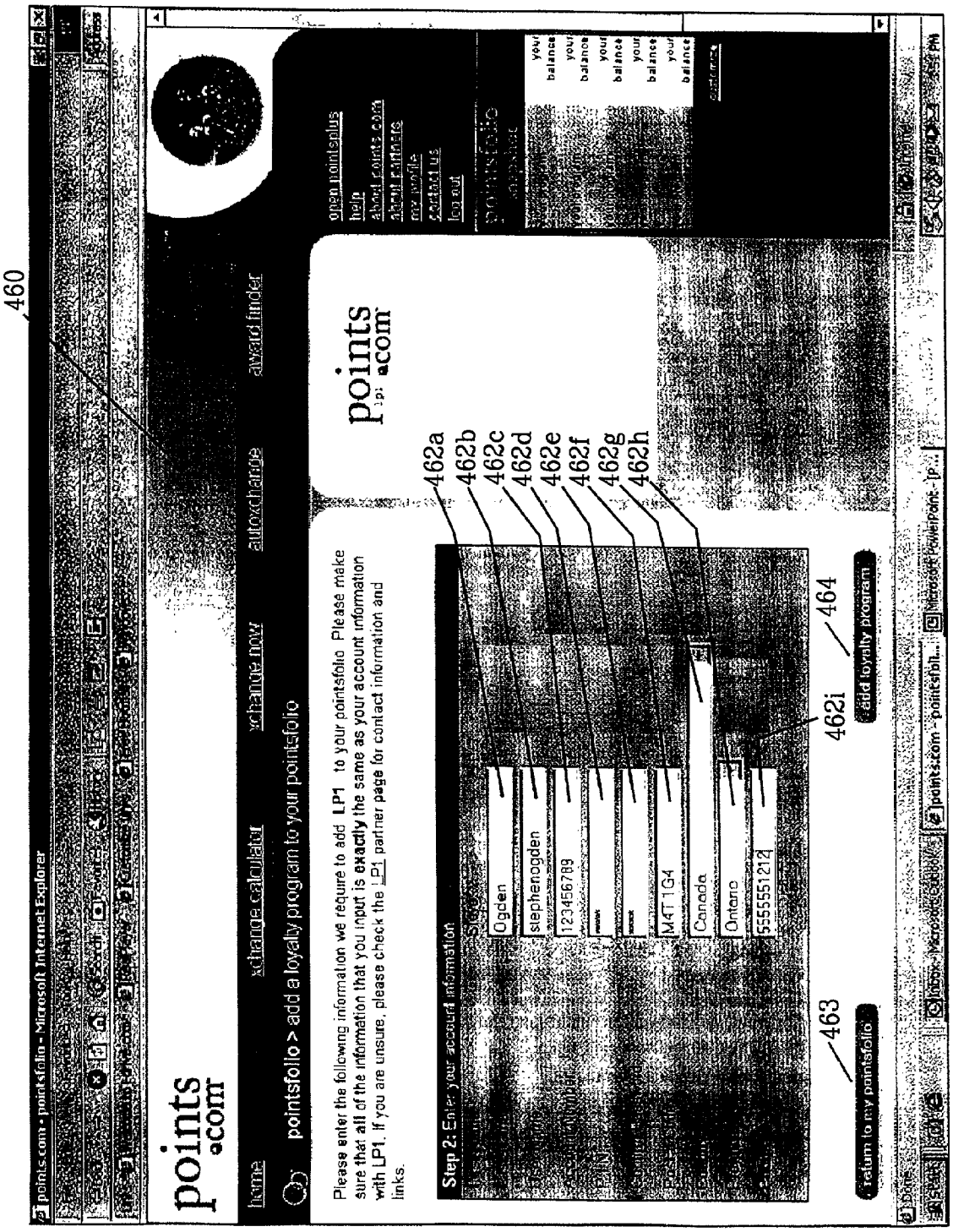
Figure 4H:
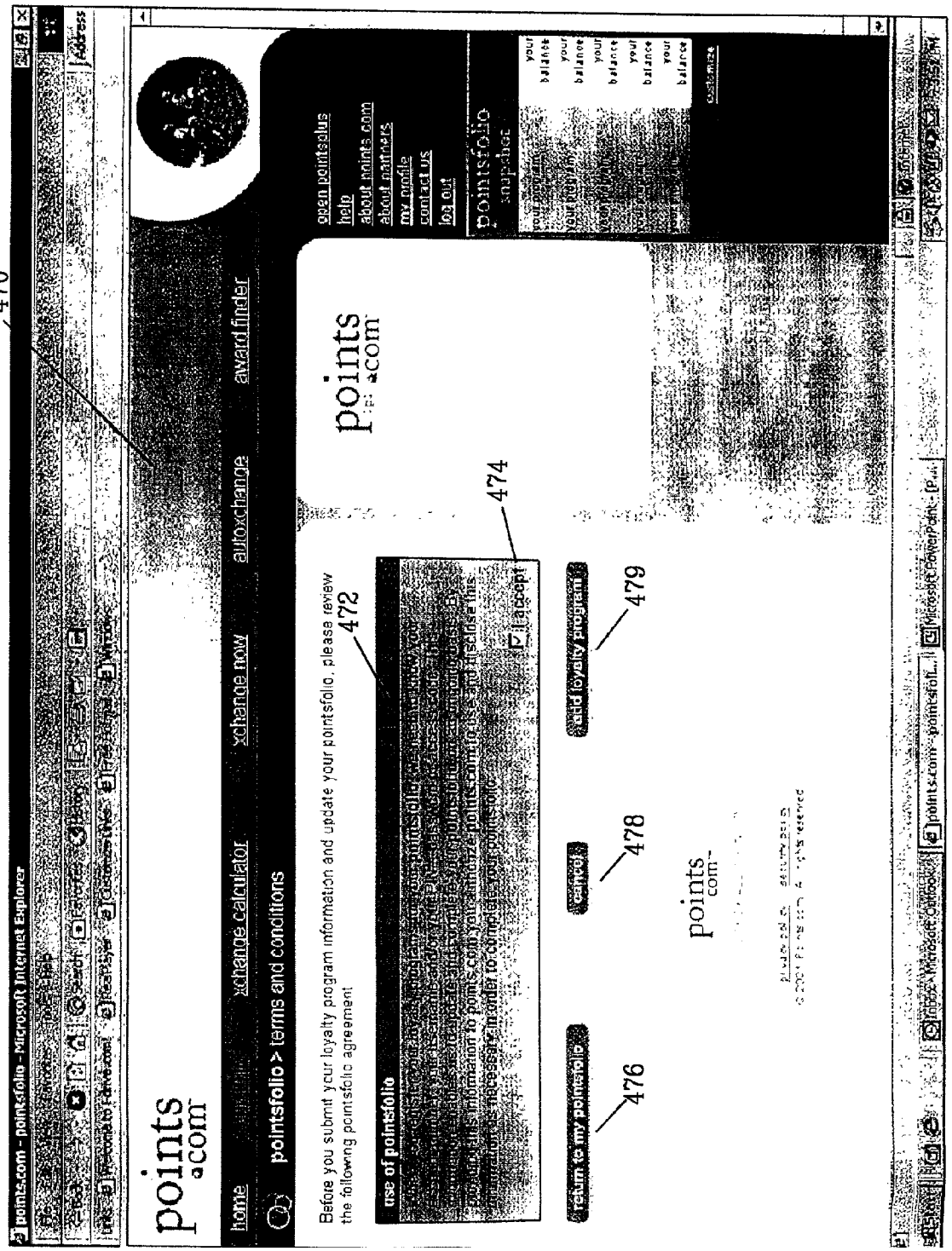
Figure 4I:
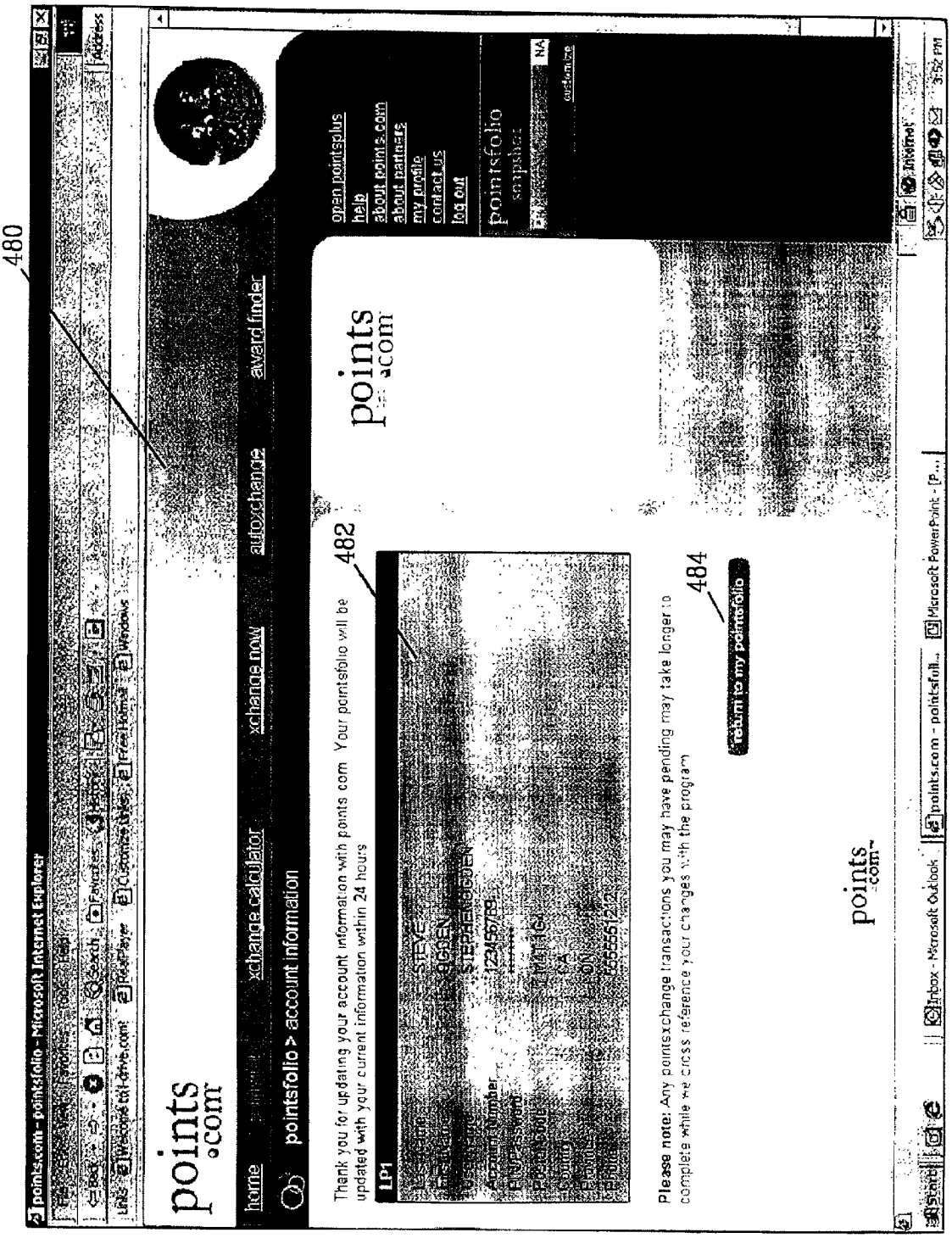

The customer clicks on the "go to next step" button 456, whereby step 314 displays the next web page 460 which presents as shown in FIG. 4G the customer with a form 462a-i. This form is distinct for each issuer LP as it requests customer information that is specific to that LP and includes information required by that particular issuer's validation rules. The validation rules define what information the issuer LP requires in order to ensure the proper identity of the customer. This set of validation rules is maintained in the master database 240 and used to generate the web page 460. The entry of this information is necessary to add the selected LP to the customer's portfolio. After the information as determined by the customer is entered in step 315, the customer then clicks on the "add loyalty program" button 464, whereby step 316 displays web page 470 that shows, as seen in FIG. 4H, an agreement for acceptance or rejection by the customer whether its information may be shared with the issuer. The customer accepts in step 317 by clicking on the box 474 and pressing button 479 to add the LP account to their portfolio. Then, in step 318, web page 480 is displayed as shown in FIG. 4I, which contains a confirmation of the customer information to be transmitted to the added LP issuer for account validation. If the customer accepts the terms and conditions, program 300 moves to step 319, which creates an account validation request for each issuer LP that the customer has added to its portfolio and constructs that request in a format and with those parts of the customer information as determined by the set of validation rules that the issuer has set for its LP. In step 320, the request is transmitted from the web server 230 via the transaction server 250 and one of the data transmission paths 206a-c to that issuer terminal 130 supporting this LP. As illustrated in program 700, described in detail below, the issuer terminal 130 validates the customer account information based on the account validation request transmitted in step 320 and transmits an account confirmation record. In step 321, the transaction server 250 receives the account confirmation record from the issuer terminal 130. In step 322, the account confirmation record is inspected and, if it shows that the customer LP account is valid, step 324 activates that LP account in the customer's portfolio in the master database 240. A valid account confirmation record will include the current points balance for that LP account. This current points balance is used to update the points balance for this LP, stored in the customer portfolio in the master database 240. If the confirmation record shows in step 322 that the customer LP account is not valid, the LP account is flagged in step 325 as erroneous and the customer is notified via email. Using this method of account validation, the issuers 130 are ensured that the transaction center 120 does not permit unauthorized access to private LP information or fraudulent attempts to exchange points.

In order to execute a points exchange, several sets of interactions are required. As shown in FIG. 2, the web server 230 must accumulate the details of the requested exchange from the customer terminal 110. These details are formulated into an exchange request, which is posted on a transaction queue in the master database 240. This exchange request contains all the details required to effect an exchange of points between issuer LPs. The transaction server 250 services any exchange requests found on the transaction queue by establishing communication with the necessary issuer terminals 130 in order to deposit or withdraw points from the appropriate customer LP accounts. The protocol by which the transaction server 250 communicates with the issuer terminal 130 can take one of several forms. In one embodiment, the transaction server 250 makes direct calls to each issuer server 280 via an application programming interface (API). This is typically called a "real time" protocol. In another embodiment, the transaction server 250 collects exchange requests from a plurality of customers and periodically sends a file of predetermined format to each issuer server 280 containing all the withdrawal and deposit transactions for those customers. A similar file is sent back from each issuer server 280 a period of time later, containing transaction confirmation messages—this is typically called a "batch" protocol. This invention is designed to operate using both types of protocols simultaneously, depending upon the agreement with the issuer in question. In addition, the master database 240 maintains a specific set of rules for each issuer, defining the specific protocol to be used when communicating with that issuer server 280. This permits extreme flexibility in connecting to a plurality of issuer servers running vastly disparate systems.

Figure 5A:
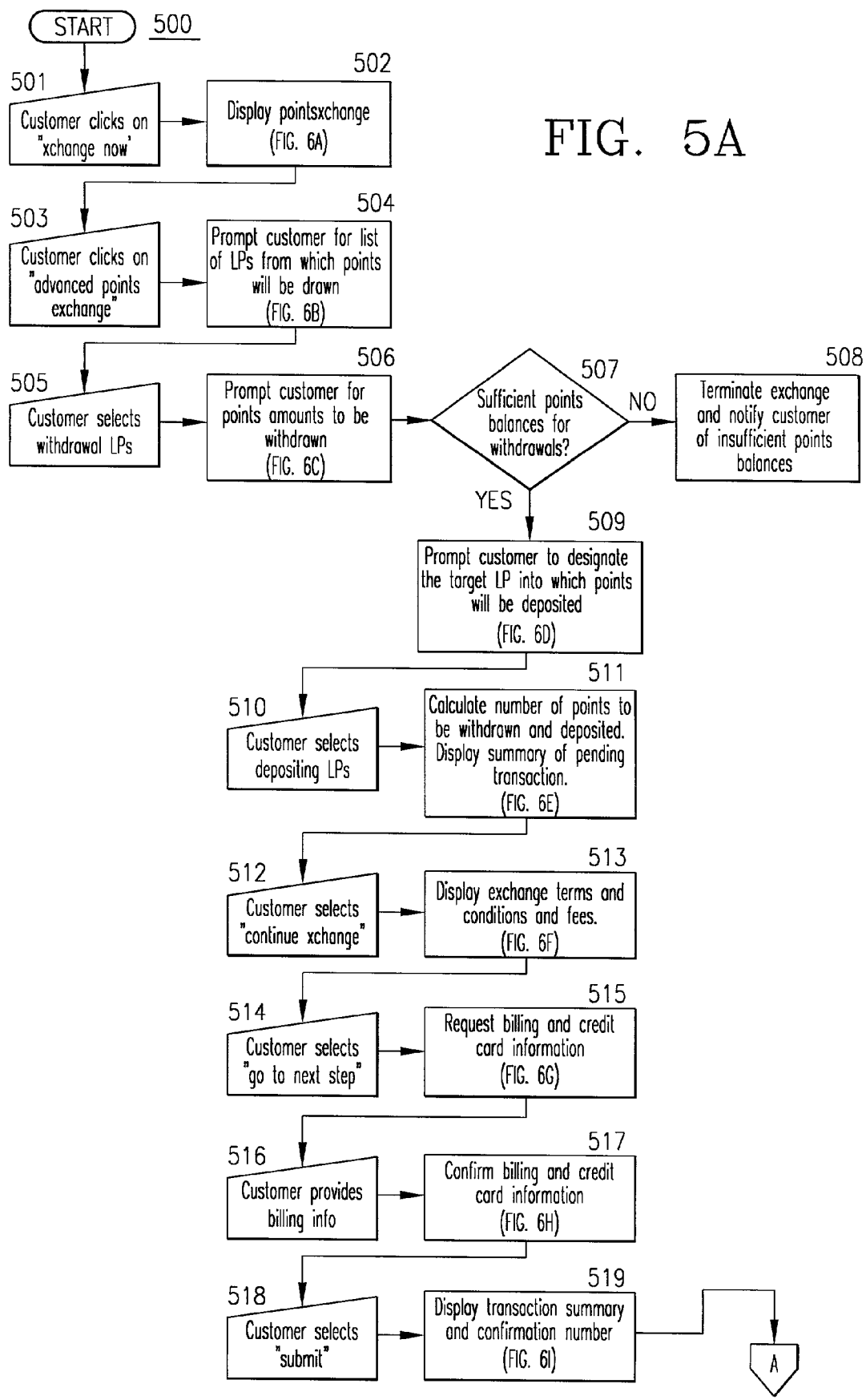
FIGS. 5A and B are collectively flow diagrams representing the computer program(s) executed on the transaction center shown in FIG. 1 to effect an exchange of a number of customer's points between the LPs selected by the customer, and to validate that the exchanges that are made by the withdrawing and depositing LPs.
Figure 6A:
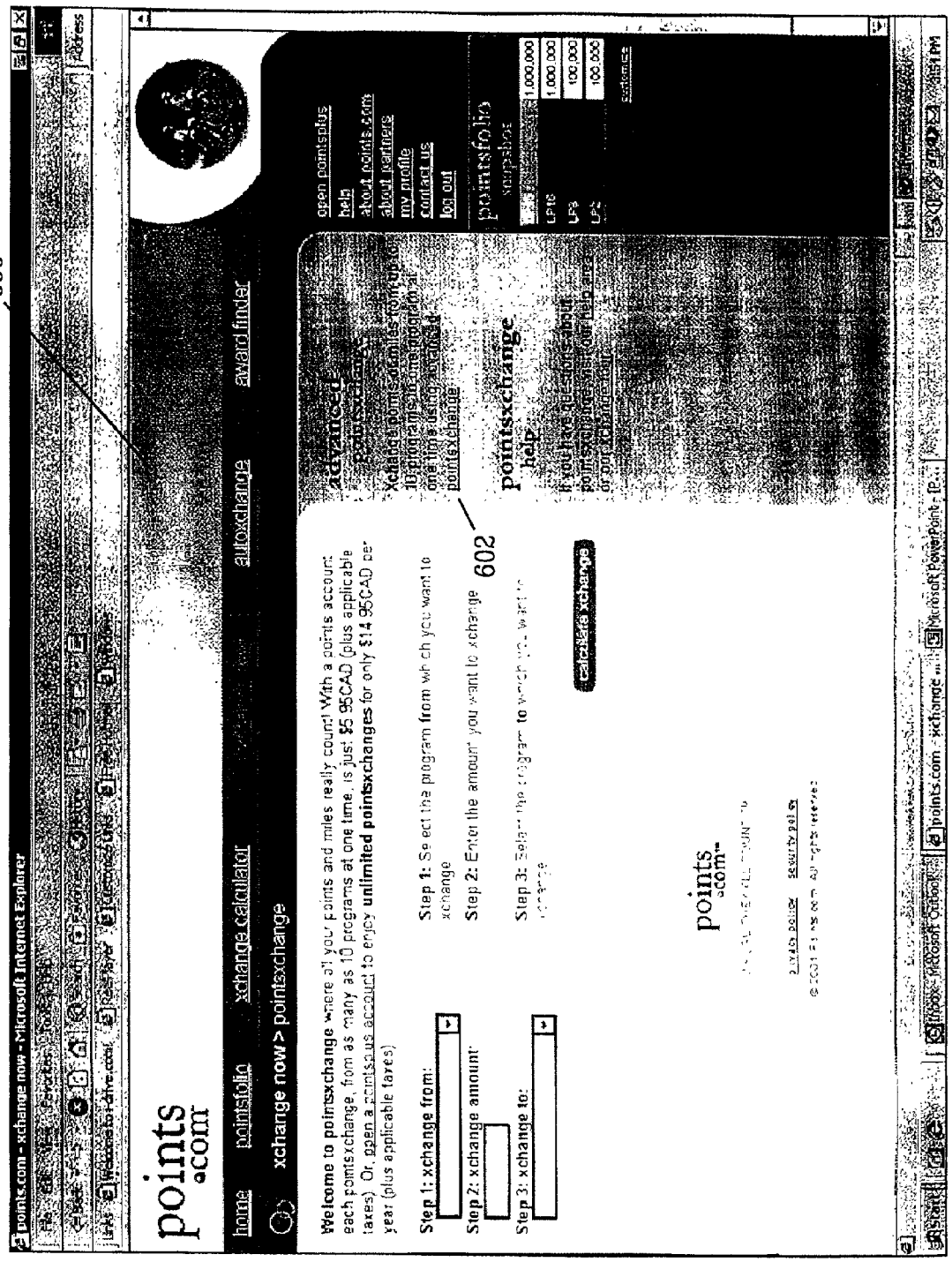
Figure 6B:
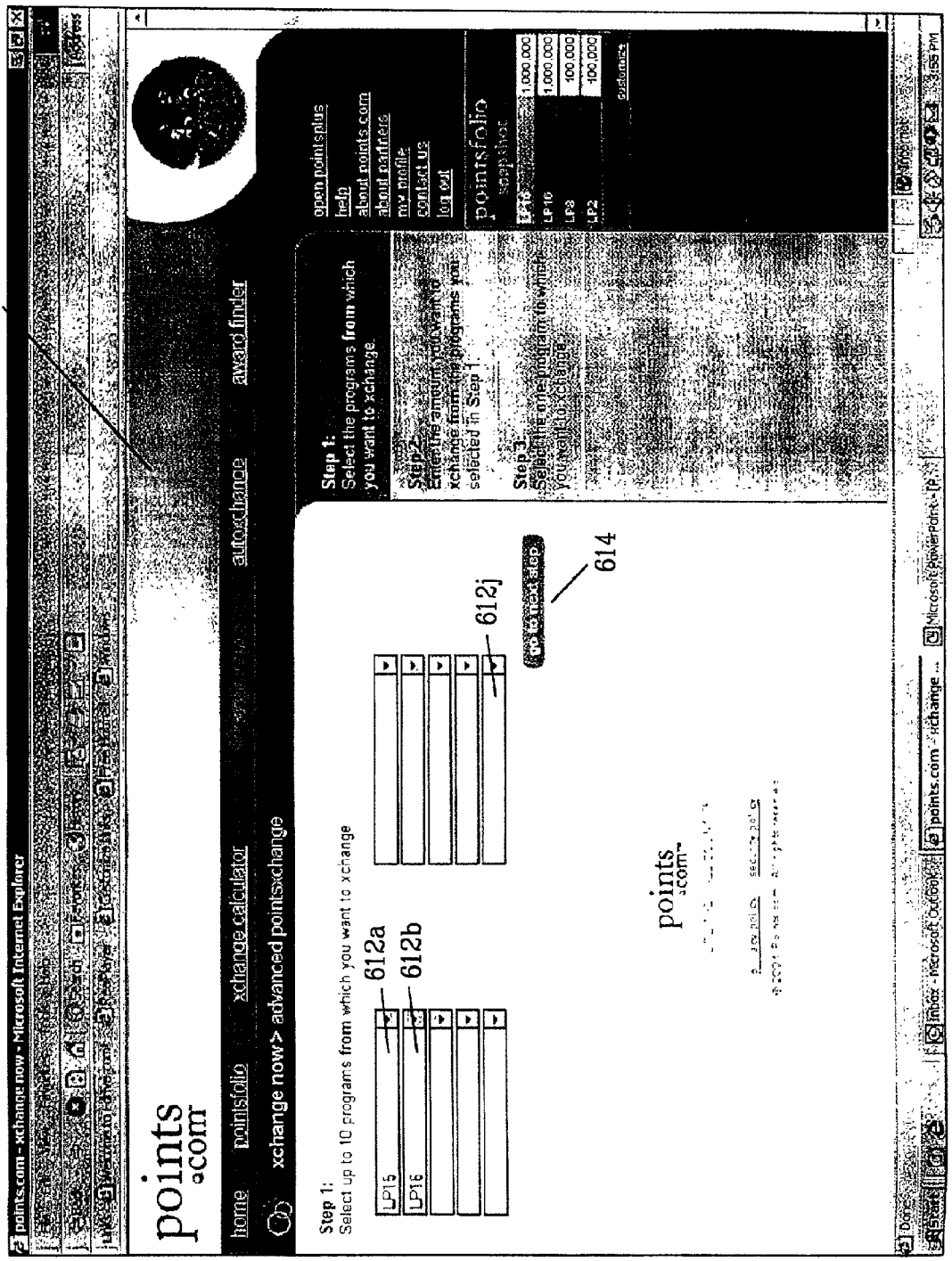
Figure 6C:
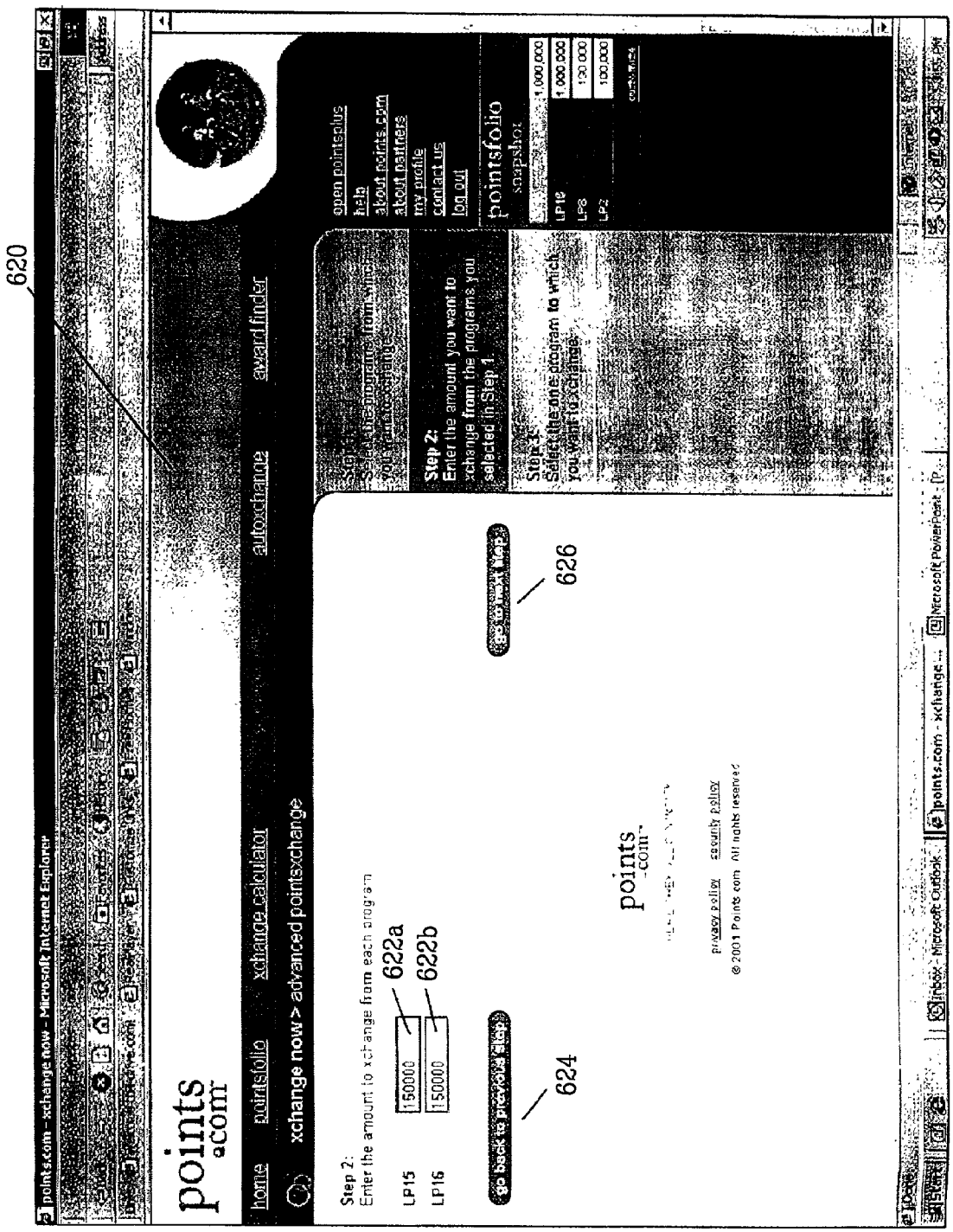
Figure 6D:
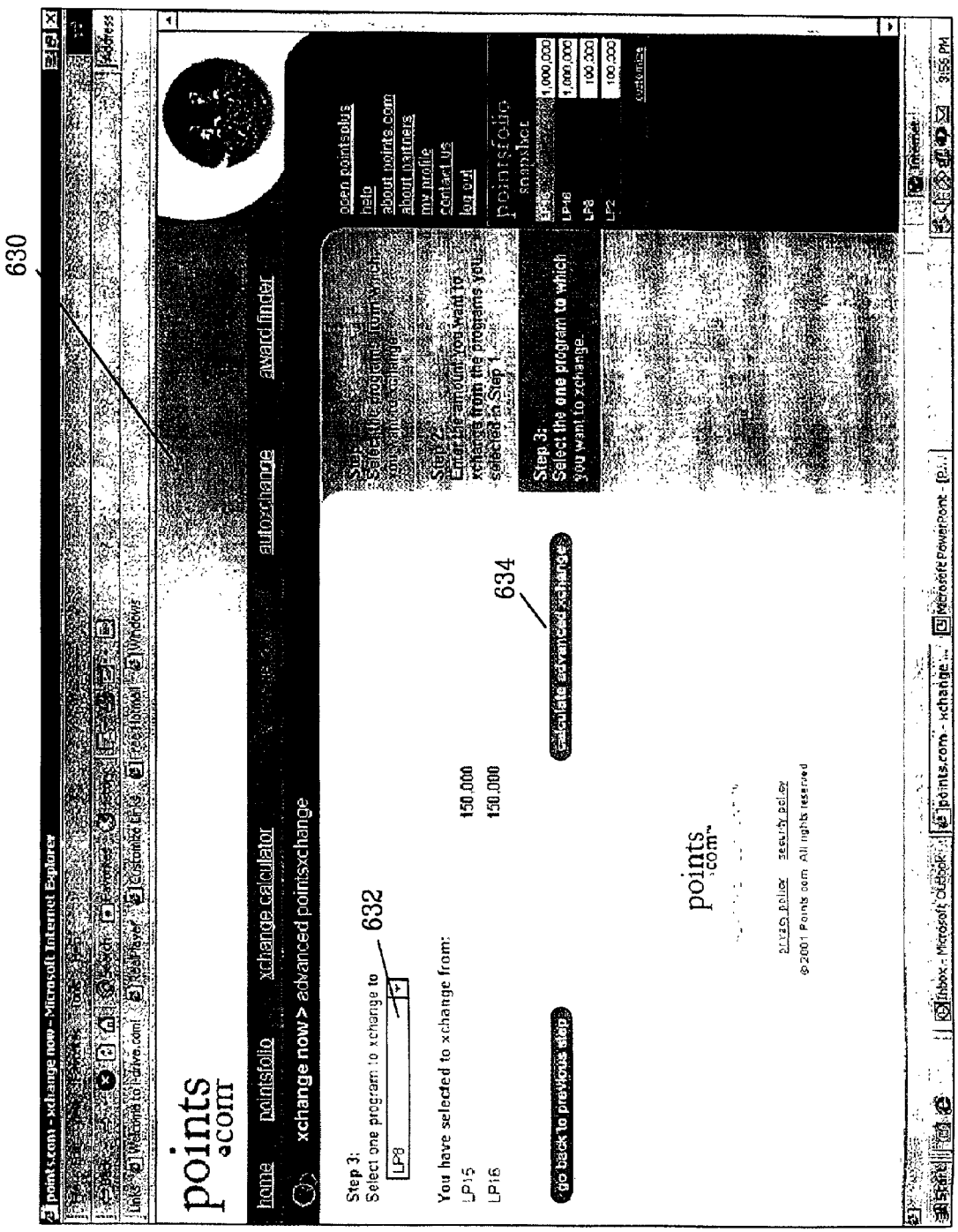
Figure 6E:
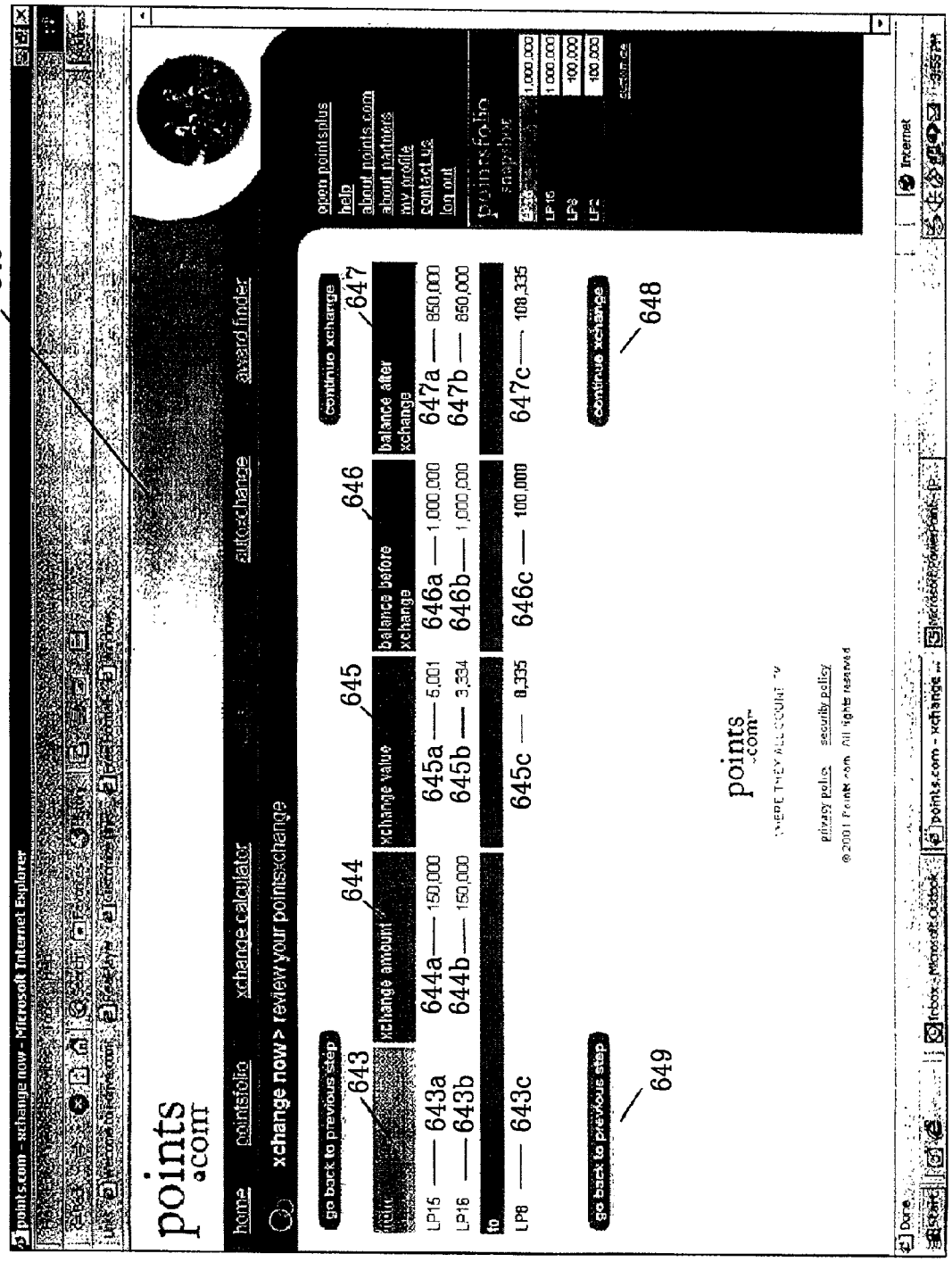
Figure 6F:
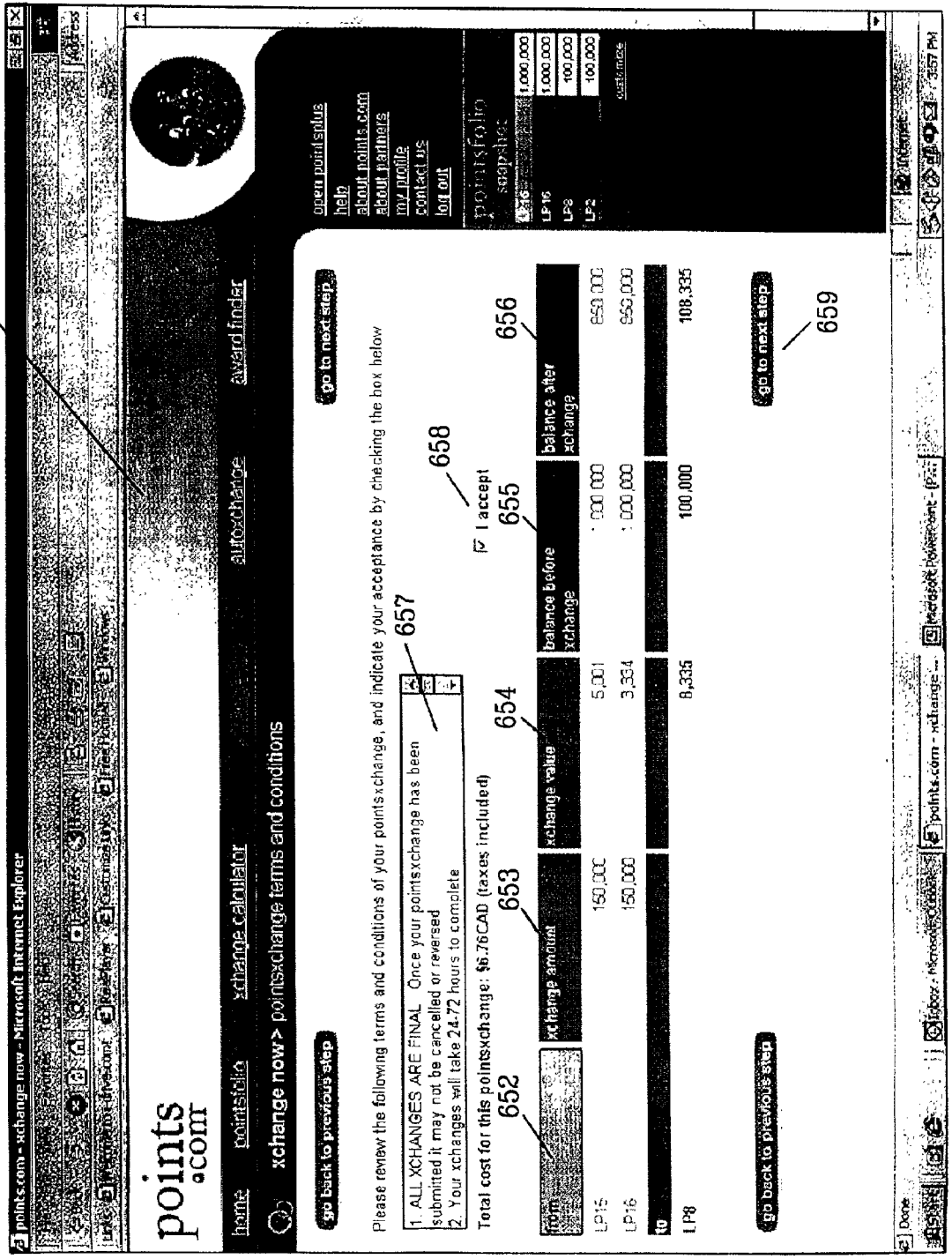
Figure 6G:
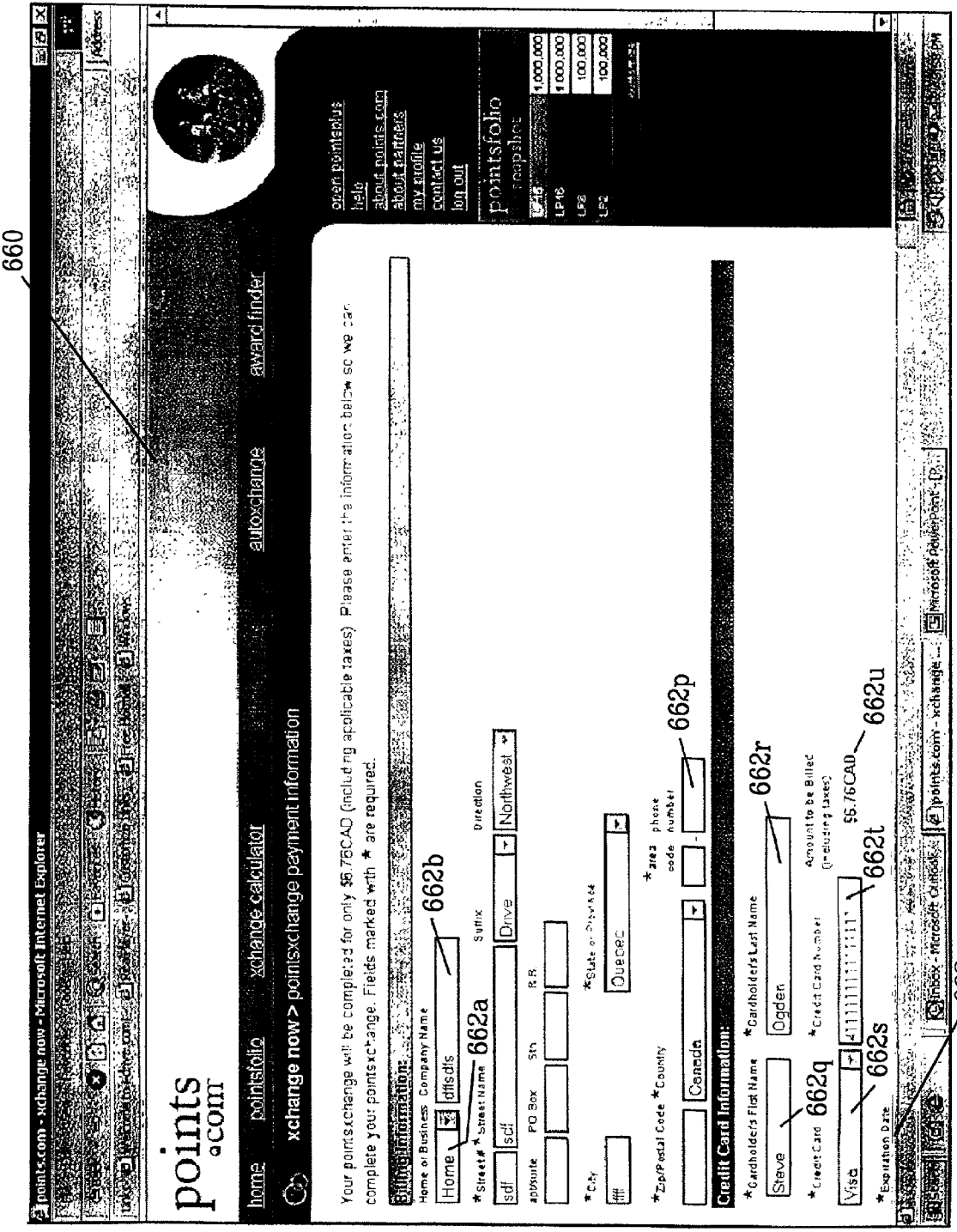
Figure 6H:
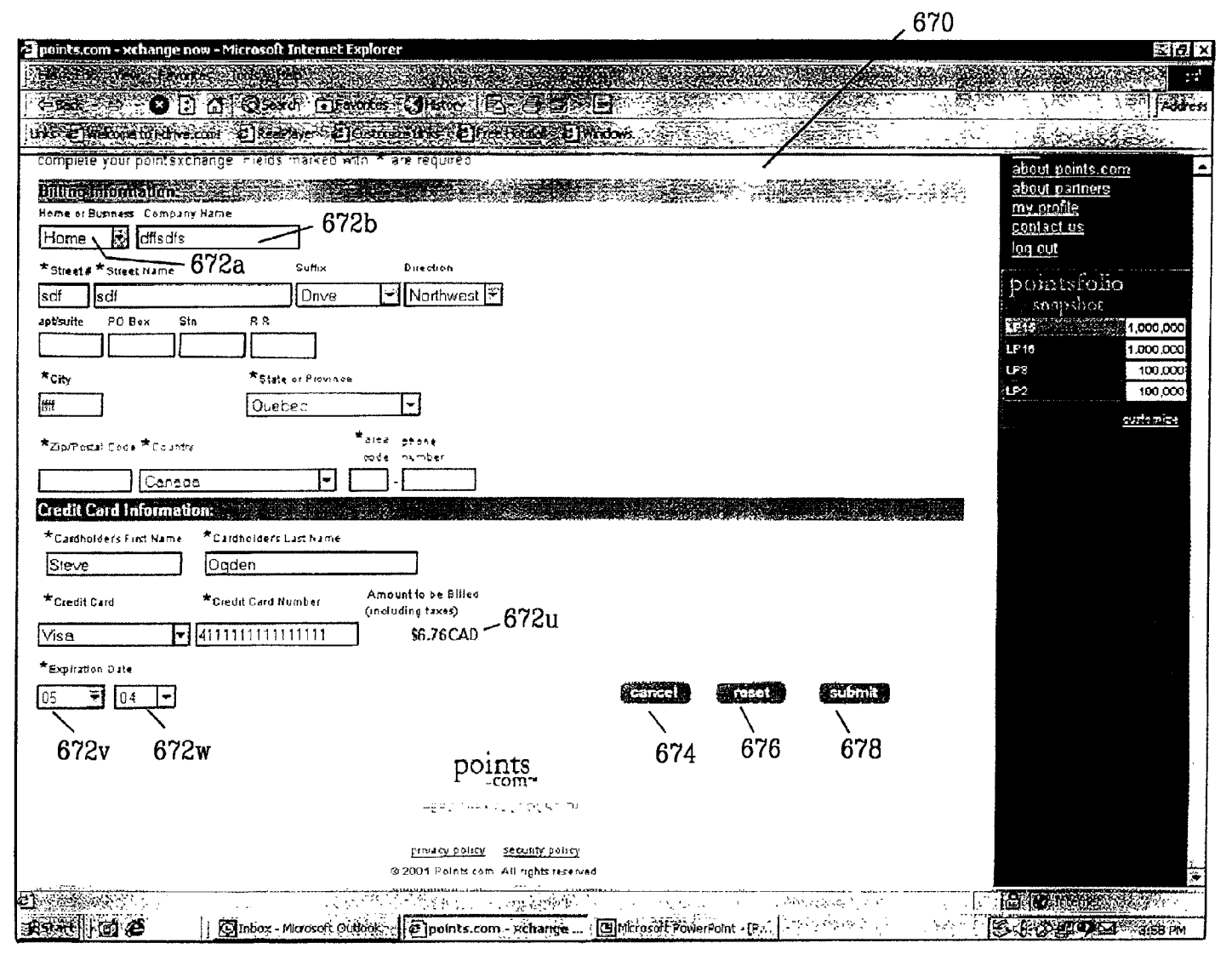
Figure 6I:
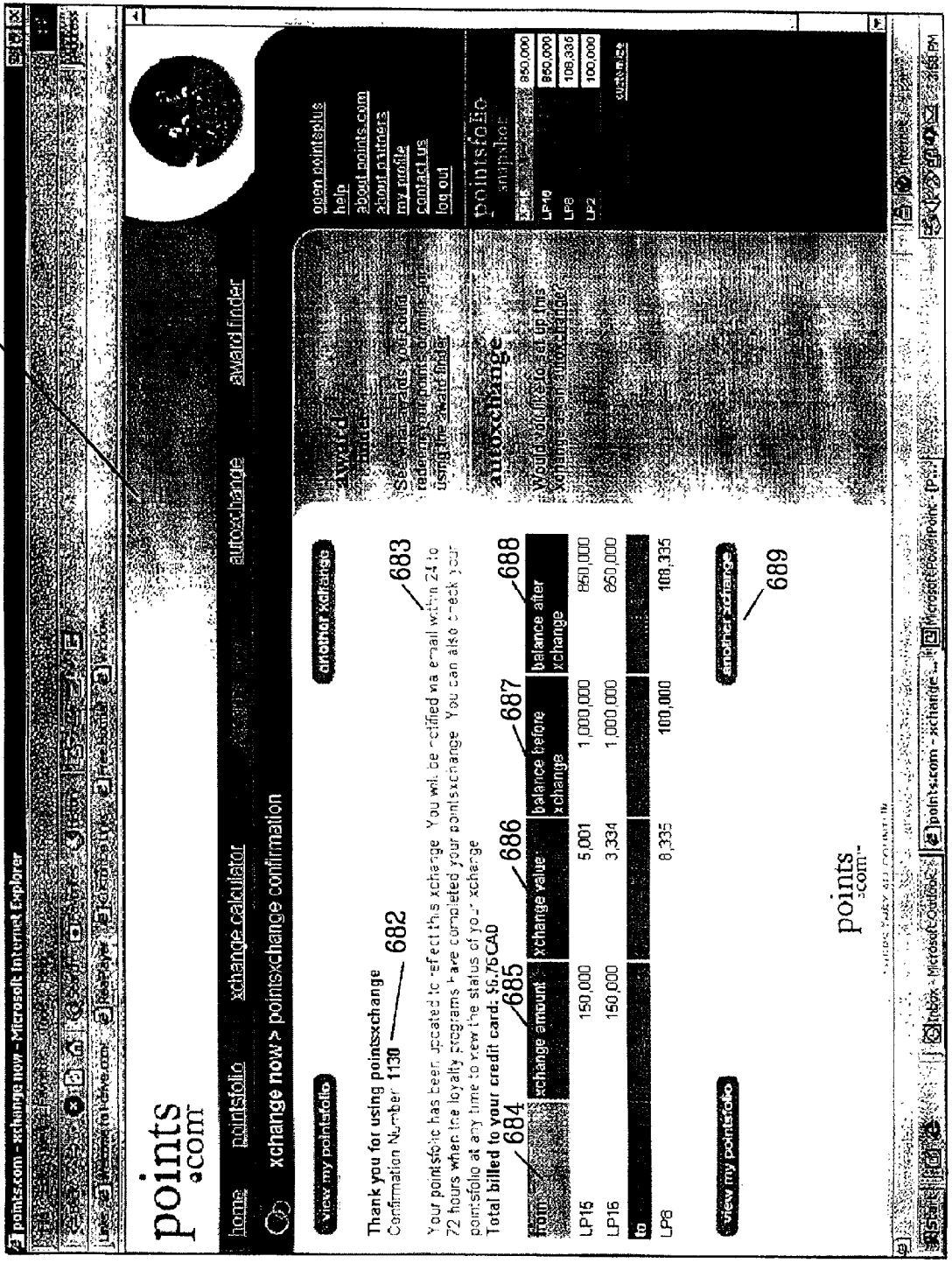

Referring now to FIGS. 5A and B, there is shown a program 500 that is stored and executed in the transaction center 120, whereby a series of web pages as shown in FIGS. 6A-I are displayed to implement the exchange of points from a first issuer LP from which points are withdrawn, i.e., a withdrawing LP, to a second issuer LP to which points are received, i.e., a depositing LP. Referring to FIG. 5A, the first phase of the points exchange program 500 is executed by the web server 230, to gather and confirm the specifics of the points exchange from the customer 110. The program 500 starts with step 501, with the customer clicking on a "xchange now" button 405 of the home web page 400 as shown in FIG. 4A. This results in step 502 with the display of an initial page 600 that explains as shown in FIG. 6A the steps for implementing an exchange of points from a first or withdrawing LP to a second or depositing LP. When the customer clicks in step 503 onto the "advanced points exchange" button 602, step 504 displays the web page 610 which has as shown in FIG. 6B a form of spaces 612a-j, where up to ten LPs may illustratively be designated as the withdrawing LPs. Only LPs of which the customer is already a validated member will be offered for selection. The customer proceeds to step 505 by actuating the "go to next step" button 614, whereby the web page 620 is displayed in step 506 as shown in FIG. 6C. Page 620 includes a plurality of boxes 622a-b to permit the customer's entry of the quantity of points to withdraw from each designated LP. After designating the withdrawing LPs, step 507 compares the current point balances of the customer's accounts in the withdrawing LPs with the number of points requested in step 506 and if the requested points is greater than the assessed account balances, then step 508 terminates the point exchange carried out by the execution of the point exchange program 500 and a message is displayed to notify the customer that its current point balances are insufficient to complete the requested points exchange. On the other hand, if the points are available in the customer's LP accounts, then the point exchange program 500 moves to step 509, which displays a web page 630 as shown in FIG. 6D. Web page 630 includes a box 632 for permitting the customer to designate the depositing LP to which the points are transferred. Though a particular embodiment has been described, one skilled in this art would appreciate that a plurality of depositing LPs could be designated. In step 510, the customer selects the depositing LP and clicks on "calculate advanced xchange" button 634. Step 511 calculates the exchange rates for this points transaction and displays page 640, a summary of the withdrawal and deposit points, as illustrated in FIG. 6E. This calculation is illustrated in greater detail as program 1000, described in detail below. In particular, step 511 calculates the number of points to be transmitted to the designated depositing LP and displays in columns 643-647 respectively the withdrawing LPs, the number of points to be withdrawn, the number of points in the withdrawing LPs (the customer's account balance) before the exchange, and the number of points after the exchange. The customer clicks in step 512 on "continue xchange" button 648 to confirm that the pending transaction is correct. The program moves to step 513, displaying page 650, which includes columns 652-656 plus the terms and conditions of the transaction and any fees as shown in FIG. 6F. In step 514, the customer clicks on the "go to next step" button 659, whereby step 515 displays a web page 660 to prompt the customer for payment information including credit card and billing address, via the form of boxes 662a-v, as shown in FIG. 6G. After the customer's credit card information has been entered in step 516, step 517 displays a web page 670 which sets out as shown in FIG. 6H a "cancel" button 674, a "reset" button 676 and a "submit" button 678, which permits the customer to cancel or revise the credit card information and, if satisfactory, to click on the "submit" button 678 in step 618, whereby the customer's credit card data is submitted to effect payment for the exchange, and to display in step 519 a web page 680 which summarizes, as shown in FIG. 6I, the points exchanged and issues a confirmation number 682.

Figure 5B:
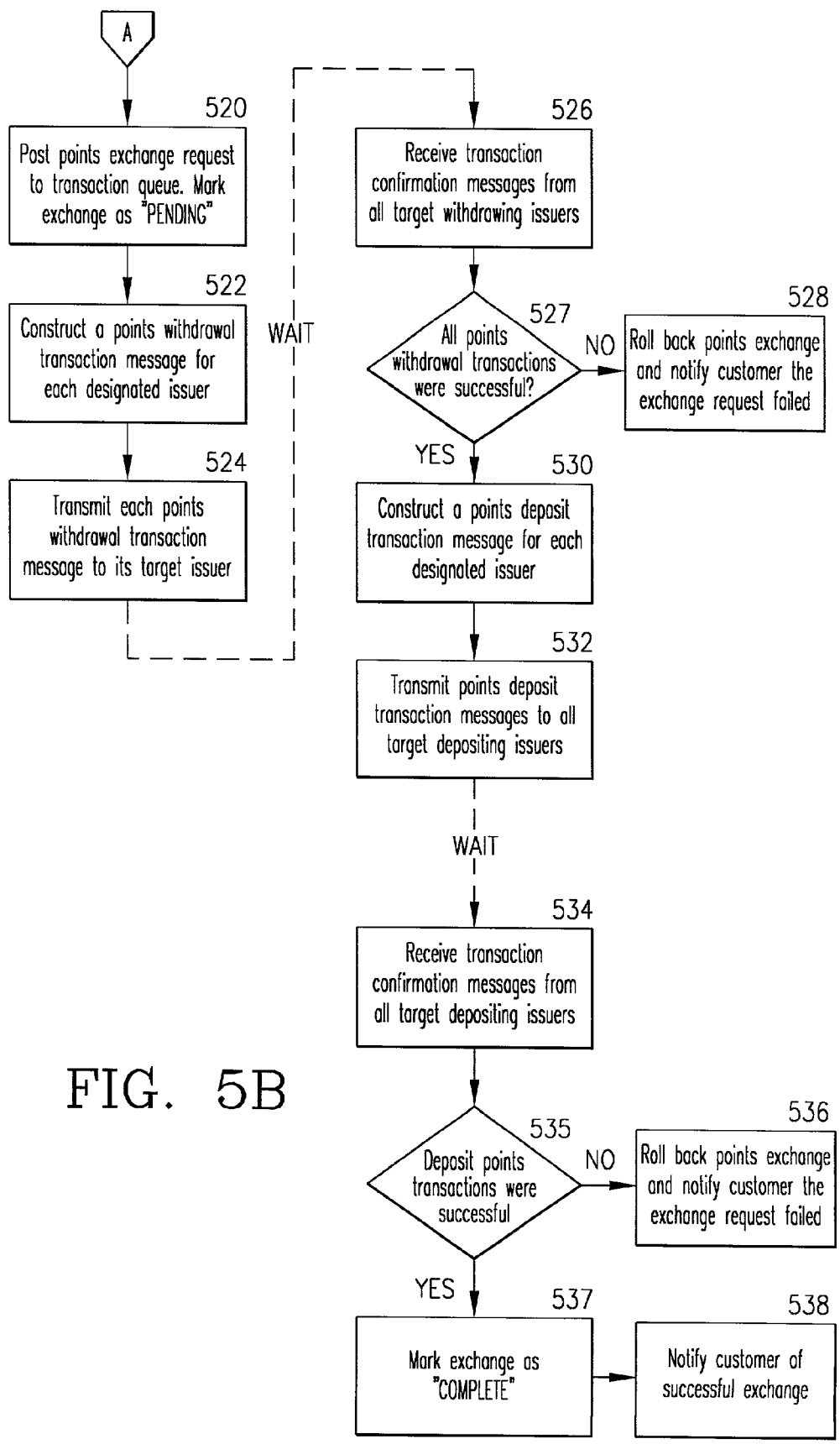

Once the details of the requested points exchange have been accumulated and confirmed by the web server 230, as shown in FIG. 2, the points exchange program 500 is executed in a two-step procedure. The first step performs all of the points withdrawals from the designated withdrawing LPs and the second step performs the points deposit to the designated depositing LPs. The transaction server 250 executes this phase of the points exchange program as shown in FIG. 5B. After the points exchange request is submitted by the customer in step 518, the web server posts in step 520 the points exchange request to a transaction queue on the master database 240 and marks the exchange as "pending". The transaction server 250 monitors this transaction queue and services any unfulfilled exchange requests that it finds in the transaction queue. In step 522, the exchange request is analyzed and a points withdrawal transaction message is constructed for each of the customer LP accounts designated as withdrawal LPs. In step 524, using one of the protocols described above, these points withdrawal transaction messages are communicated from the transaction server 250 to the designated issuer servers 280 via the appropriate communications link 206. No further action is taken on this points exchange request until a transaction confirmation message has been received from each of the issuer servers 280 designated in step 524. Once the transaction confirmation messages are received from the issuer servers 280 associated with the withdrawing LPs in step 526, step 527 is executed to analyze the transaction confirmation messages to determine whether all of the withdrawal transactions were successful. If any of the withdrawal transactions failed, the corresponding confirmation message will contain an error code. In this event, step 528 rolls back the entire points exchange transaction and the customer is notified via email that the exchange request was not executed.

If all of the withdrawal transactions were successful as determined in step 527, step 530 constructs a points deposit transaction message for each customer LP account designated as a depositing LP. In step 532, using one of the protocols described above, the transaction server 250 transmits these points deposit transaction messages to the issuer servers 280 associated with the designated depositing LPs. No further action is taken on this points exchange request until a transaction confirmation message has been received from each of the issuer servers 280 associated with the LPs designated in step 530. Once the transaction confirmation messages have been received in step 534, step 535 is executed in which the confirmation message is analyzed to determine whether all of the deposit transactions were successful. If a deposit transaction failed, step 528 rolls back the entire points exchange transaction and notifies the customer via email that the exchange request was not executed. If all deposit transactions succeeded, step 537 changes the points exchange request from "pending" to "complete", and step 538 notifies the customer illustratively by email of a successful points exchange.

Figure 7A:
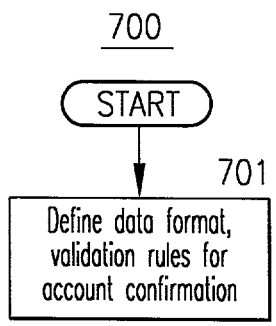
FIGS. 7A, B, C, D, E, F, G and H are flow diagrams which represent the process of the programs executed on a server of each LP's terminal as shown in FIG. 2 respectively to receive from the transaction center of FIGS. 1 and 2 a record bearing the customer's information, to validate that information by comparison with a set rules of that LP terminal, to sense changes in the balance of the customer's account as kept at this issuer's terminal, upon change, to send to the transaction center messages each with the current balance of that customer's account, to process communications from the transaction center, to compare the exchange of points with the exchange rules of both of the withdrawing and depositing LPs and, if validated, posting the deposits and withdrawals of the points to a customer's accounts of the respective LPs.

Referring now to FIGS. 7A, B, C, D, E, F, G and H, there are shown programs 700, 710, 720, 730, 740, 750, 760 and 770 that are stored and executed in the issuer server 280 of each issuer terminal 130. These programs each execute a distinct function: validating customer's LP account information; providing current point account balances; and performing points transactions (withdrawal and deposit). Referring first to FIGS. 7A and B, there is illustrated the programs 700 and 710 which facilitate each issuer terminal 130, as shown in FIG. 2, to determine whether the customer account information supplied from the transaction center 120 in program 300 is properly formatted, includes all of the information required by this particular issuer terminal 130, and whether the customer described has a valid account in the issuer's LP. The format and content criteria of each issuer terminal 130 is defined by a set of rules, which each issuer sets in accordance with its own requirements. It will be appreciated that the use of a set of rules permits the transaction center 120 to communicate with different kinds of issuer terminals 130. In particular as will now be described, the transaction center 120 can adapt the customer information as to its content and format that will be sent to a particular issuer terminal 130 in accordance the criteria of that terminal 130. The transaction center 120 maintains the data format and validation rules for each issuer in the master database 240 and uses them to formulate all messages to each issuer terminal 130. The account validation process comprises two components: 1) the account validation request, which is sent from the transaction center 120 to the issuer terminal 130; and 2) the account confirmation record, which is sent from the issuer terminal 130 to the transaction center 120, in response to the account validation request. The format of an account validation request/account confirmation record pair can take several possible forms. In one illustrative embodiment, each message is formulated using Extensible Markup Language (XML), a variable-length text record or a fixed-length text record. The validation rules for successful account confirmation comprise a direct match between the customer information provided in the account validation request and the customer information stored in the issuer database 285. The account validation request must contain the customer's full proper name, complete mailing address, LP member ID, transaction center account ID and, in most cases, a PIN or password. Referring to FIG. 7A, each issuer in step 701 constructs a first set of rules which define the format and content of the customer information that will be used by its LP and stores that set of rules in its issuer database 285. In particular, a list is established in the master database 240 for storing the particular format used by a particular LP and the content of the customer information required by that LP. Then when the transaction center 120 constructs the account validation request, it accesses that list to ensure that the customer's validation request is constructed by the transaction center 120 to include the LP's data format and all of the customer information required by the LP.

Figure 7B:
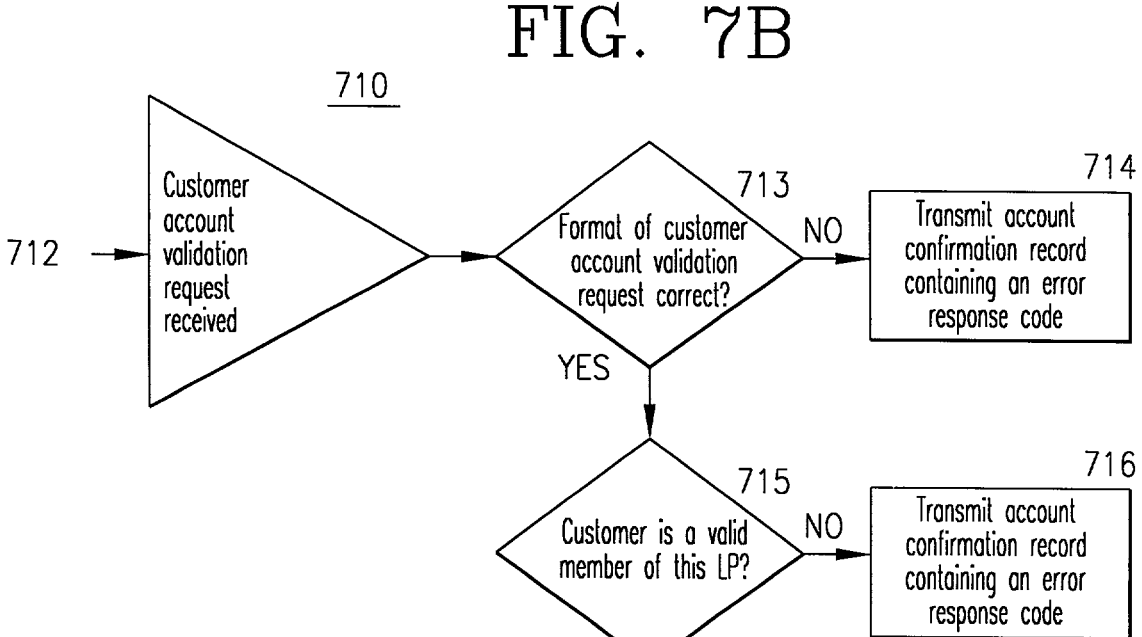

Referring now to FIG. 7B, the customer account validation program is explained. First, in step 712, the issuer server 280 receives from the transaction server 250 via a data transmission line 206 a customer account validation request. Next, step 713 determines whether the customer information transmitted inside this request satisfies the issuer's set of rules as to the format of the transmitted information. If the information fails to satisfy this set of rules, step 714 transmits to the transaction server 250 an account confirmation record containing an error response code. Otherwise, step 715 determines if the transmitted customer account information meets the defined validation rules and thereby represents a valid member of the issuer's LP. If the information fails to satisfy this set of rules, step 716 transmits to the transaction server 250 an account confirmation record containing an error response code. On the other hand if the validation rules are satisfied, step 717 accesses the current points balance of the customer's LP account that is kept in the issuer database 285 and constructs an account confirmation record containing the current points balance and a confirmation code. The constructed confirmation record is transmitted back to the transaction server 250. Next, step 718 sets a flag in the customer's LP account stored in the issuer database 285 whereby this customer is identified as also a customer of the transaction center 120. The transaction center account ID (as established in program 300) of this customer is also kept in the customer's LP account stored in the issuer database 285 such that the issuer terminal 130 can send messages to the transaction center 120 and properly identify this customer. As explained above, the return of the account confirmation record to the transaction center 120 completes the process of adding a LP to the customer's portfolio stored on the master database 240, and permits that customer to request points exchanges involving this issuer.

Referring now to FIGS. 7C, D and E, there are shown the programs 720, 730 and 740, which transmit changes in customer points balances from each of the issuers terminals 130 to the transaction center 120. Using these programs, the transaction center 120 is able to maintain current points account balances in its customer portfolios. As in program 700, the first step 721 of program 720, establishes the data format and communications protocol for point account balance updates. This permits the issuer to define the method by which updates will be provided to the transaction center 120. Two preferred embodiments are illustrated in FIGS. 7D and E. In the first embodiment as shown in FIG. 7D, program 730 includes step 732 which monitors the points balance of the customer's LP account that is maintained in the issuer database 285 for change, e.g., a deposit or withdrawal of points from the customer's LP account. In the course of managing the LP, points are added to the customer's account typically when the customer purchases some goods or services, or are withdrawn when the customer redeems its points for some reward. When the account balance of the customer's LP account changes, step 733 accesses the balance the customer's LP account and constructs a record that includes the updated account balance and the ID of the customer's transaction center account. The issuer server 280 transmits this record via a data transmission path 206 to the transaction server 250, which in turn stores the updated account balance in the customer's portfolio maintained in the master database 240 using the customer's central control ID as the address of that portfolio. This embodiment is termed a "push" update, in which the issuer "pushes" new account balance information to the transaction center as those changes occur.

The second embodiment of this invention, as shown in FIG. 7E, includes the program 740, which begins in step 744 to detect a message from the transaction server 250 requesting an updated account balance for a specified customer. Step 745 determines whether the message is correctly formulated and, if it is not, executes step 746 to transmit an error code to the transaction server 250. If the message if properly formulated the customer information as determined in step 745, step 747 examines the customer information in the message to determine whether this is a previously registered customer (as performed in program 700). If it is not, step 748 transmits an error code back to the transaction server 250. If the customer information is valid, step 749 accesses the balance the customer's LP account and constructs a record that includes the updated account balance and the ID of the customer's transaction center account. The issuer server 280 transmits this record via a data transmission path 206 to the transaction server 250, which in turn stores the updated account balance in the customer's portfolio maintained in the master database 240 using the customer's central control ID as the address of that portfolio. This embodiment is termed a "pull" update, in which the transaction center 120 periodically "pulls" new account balance information from the issuer terminal 130.

Referring now to FIGS. 7F, G, and H, the programs 750, 760 and 770 are shown that validate and execute an exchange of points between two or more LPs that have been designated by the customer as explained above. As described above, a points exchange includes the steps of the withdrawal of points from one or more of the customer's LP accounts followed by the deposit of points into another of the customer's LP accounts. Each issuer terminal 130 must be equipped with a method of receiving points withdrawal and deposit transaction messages from the transaction center 120, validating the transaction messages and executing the corresponding changes to the customer's account balance within that LP. Referring first to program 750 as shown in FIG. 7F, step 751 sets the rules for validating a points exchange transaction. These rules assure that the transaction center 120 communicates with the issuer terminal 130 in a manner that accommodates the issuer server 280 and its programming that is associated with that LP. The format of a withdrawal or deposit transaction message/confirmation record pair can take several possible forms. In one illustrative embodiment, each message is formulated using Extensible Markup Language (XML), a variable-length text record or a fixed-length text record. The validation rules for a transaction message, comprise matching a valid LP member ID, customer's first and last name and transaction center ID to the customer membership information stored in the issuer database 285. As explained above, the transaction center 120 examines the list retained in its master database 240 to ensure that the selected data format matches that of the LP and that the content of the customer information satisfies the requirements of its LP. In addition, the number of points to be withdrawn or deposited is specified, followed by a unique sequence identifier, ensuring that the transaction is properly recorded and not accidentally replicated. In addition, if a withdrawal transaction message is received, the issuer server 280 must check that the number of points to be withdrawn from the customer's LP account stored in the issuer database 285 does not exceed the balance of that account. In this regard, the balance of the customer's LP's account may have changed since the last updating of the customer's transaction center account and may not be sufficient to satisfy the number of points specified by a withdrawal transaction message.

Referring now to program 760 as shown in FIG. 7G, the issuer server 280 in step 762 receives from the transaction server 250 a withdrawal transaction message and compares it with the set of rules set for that issuer terminal 130. Step 763 determines if the message is properly formulated. If not, step 764 transmits an error response code to the transaction server 250. Otherwise, step 765 determines whether the withdrawal transaction message satisfies the designated set of validation rules and, if not satisfied, step 766 transmits a response with an error code to the transaction server 250. As explained above, the program 500 responds to that error code by notifying the customer of the error and prompting the customer to update its information. If the rules are satisfied, step 767 posts a credit to the customer's LP account for the withdrawn points. Next, step 768 transits to the transaction server 250 a transaction confirmation record with a confirmed response code and the updated points balance in the customer's LP account. As described above, this current balance in used to update the balance in the customer's transaction center portfolio.

Referring now to program 770 as shown in FIG. 7H, the issuer server 280 receives in step 772 from the transaction server 250 a deposit transaction message. Step 773 determines if the message is properly formulated. If not, step 774 transmits an error response code to the transaction server 250. If the message is properly formulated, step 775 compares determines whether the withdrawal transaction message satisfies the designated set of rules and, if not satisfied, step 776 transmits a response with an error code to the transaction server 250. As explained above, the program 500 responds to that error code by notifying the customer of the error and prompting the customer to update its information. If the rules are satisfied, step 777 posts a debit to the customer's LP account for the deposited points. Next, step 778 transits to the transaction server 250 a transaction confirmation record with a confirmed response code and the updated points balance in the customer's LP account. As described above, this current balance in used to update the balance in the customer's transaction center portfolio.

In order for a points exchange to be executed, each points withdrawal or deposit transaction must be monetized, i.e. the set of points to be exchanged must be convertible into a common currency which has a recognized relation to each of the LPs involved in the transaction. For example, the points of the withdrawing LP have a first value per point in U.S. dollars, whereas the points of the depositing LP has a second value per point in U.S. dollars. This is the mechanism by which disparate currencies such as different loyalty points can be exchanged. As described previously, each point held in an LP account has an inherent monetized value represented as a liability on the balance sheet of the LP's accounting records. Any withdrawal of points from that LP's accounts represents a real reduction in that liability and has a monetary value. By defining a rate per point that the LP is willing to pay to have points withdrawn from their accounts, the LP is able to "buy down" that liability. This rate, called the point withdrawal rate, represents the monetization of first half of the points exchange. Similarly, the deposit of points into an LP's accounts represents an increase in the liability of that LP. By defining a rate per point that the LP is willing to be paid to deposit points into their accounts, the LP is able to "sell" their points currency. This rate, called the point deposit rate, represents the monetization of the second half of the points exchange. The practice of permitting third party organizations to "buy" points is long established in the loyalty industry as represented by affiliate programs such as credit cards which allow customers to earn frequently flyer points with an airline when using that credit card.

Figure 8:
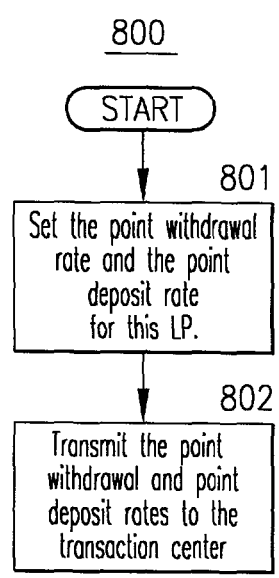
FIG. 8 is a flow diagram which represents the process of a program stored in the database of and executed on a server of each LP's terminal as shown in FIGS. 1 and 2 for permitting each LP to enter its own point withdrawal rate and point deposit rate, and to transmit and store these rates in the master database of FIG. 2.

Referring now to FIG. 8, a program 800 is shown that is stored and run in the issuer server 280 of each issuer terminal 130. Initially in step 801, each issuer sets its point withdrawal rate and its point deposit rate. Next, step 802 transmits these rates to the transaction center 120 to be stored in the master database 240. A flag is also set in the master database 240 indicating that the issuer has set these rates. As explained above, a customer will not be able to add the issuer's LP to its portfolio or to initiate a points exchange with a particular LP until its issuer has submitted its point withdrawal and deposit rates. Each issuer is free to change these rates at will, allowing the effective exchange rates between LPs to float as market conditions change.

Figure 9:
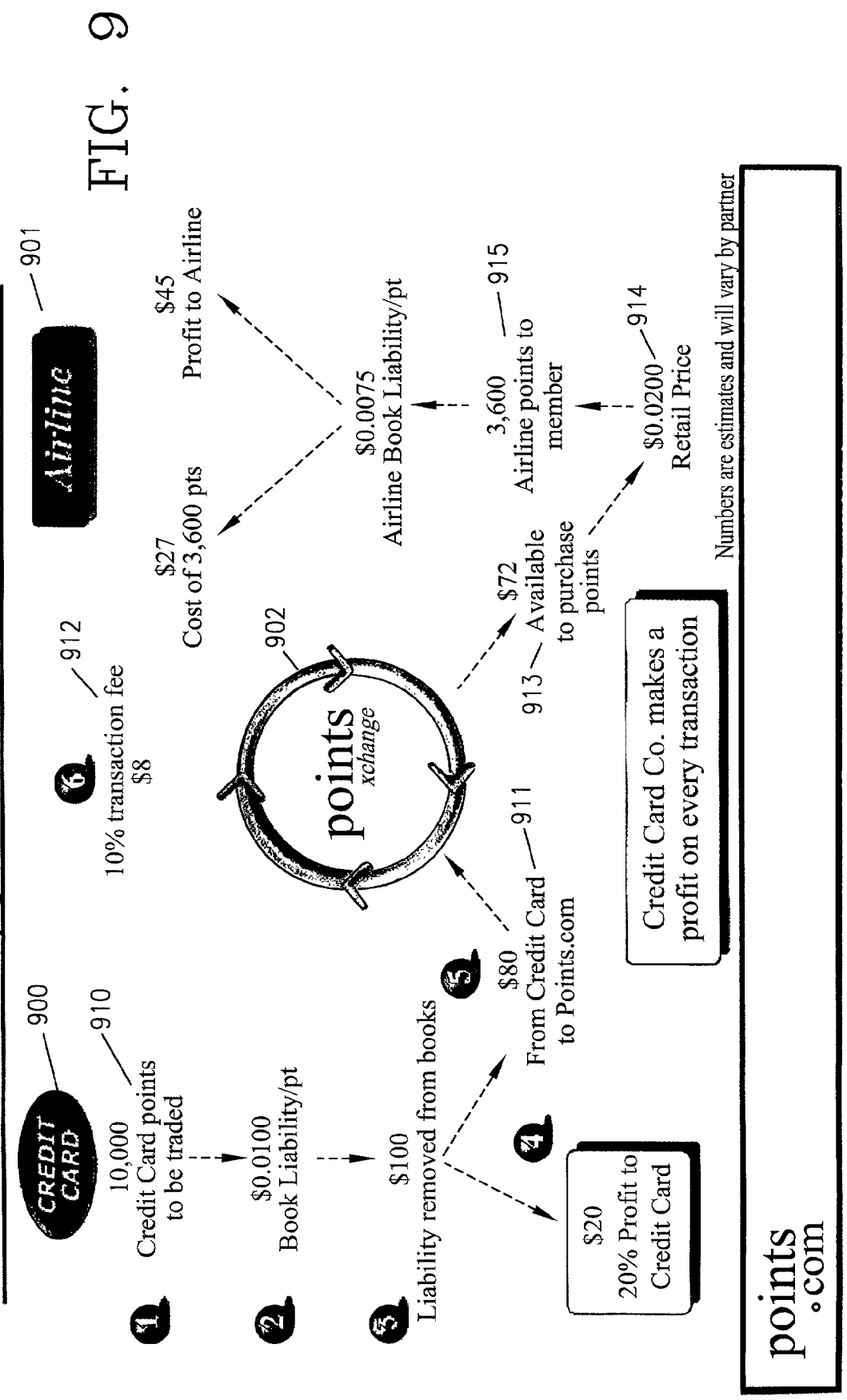
FIGS. 9 and 10 are respectively a flow diagram showing how the flow of points between the selected LPs and the distribution of profit to the LPs and the transaction center are carried out, and a flow diagram which represents the process of a program stored on the master database and executed by the transaction server of FIGS. 1 and 2 to calculate the number and value of the points deposited in the withdrawing and depositing LPs and posting these calculated values to the respective reconciliation accounts of the withdrawing and depositing LPs.

Once the points withdrawal and deposit rates have been established, as described above, the effective points exchange rate between two LPs can be calculated. This calculation is shown in an illustrative embodiment in FIG. 9. In this example, an exchange from one LP to another is shown. There are three parties involved in the exchange. A first or withdrawing issuer executing a point withdrawal 900, a second or depositing issuer executing a points deposit 901 and the transaction center 902. A withdrawal of 10,000 points in step 910 from the first issuer 900 is requested. The first issuer 900 has examined its liability/points and set its point withdrawal rate at $0.008 per point. This means that for a withdrawal of 10,000 points from the customer's account with the first issuer 900 will pay $80 in step 911 to the transaction center 902. The transaction center 902 levies in step 912 a transaction fee in the amount of $8 that was set as a percentage of the cost of the withdrawal, leaving $72 (913) available to buy points from the second issuer 901, which has set in step 914 its point deposit rate at $0.02. In step 915, the transaction center 902 uses the available $72 to deposit 3,600 points in the customers account in the second issuer 901. In this example, the customer sees an effective points exchange rate of 3,600: 10,000 or 0.36 between the first issuer 900 and the second issuer 901. FIG. 9 also illustrates that, by setting a points withdrawal rate that is lower than the book liability per point and by setting a points deposit rate that is higher that the book liability per point, the issuers are able to generate a profit on both points withdrawal and deposit transactions.

Figure 10:
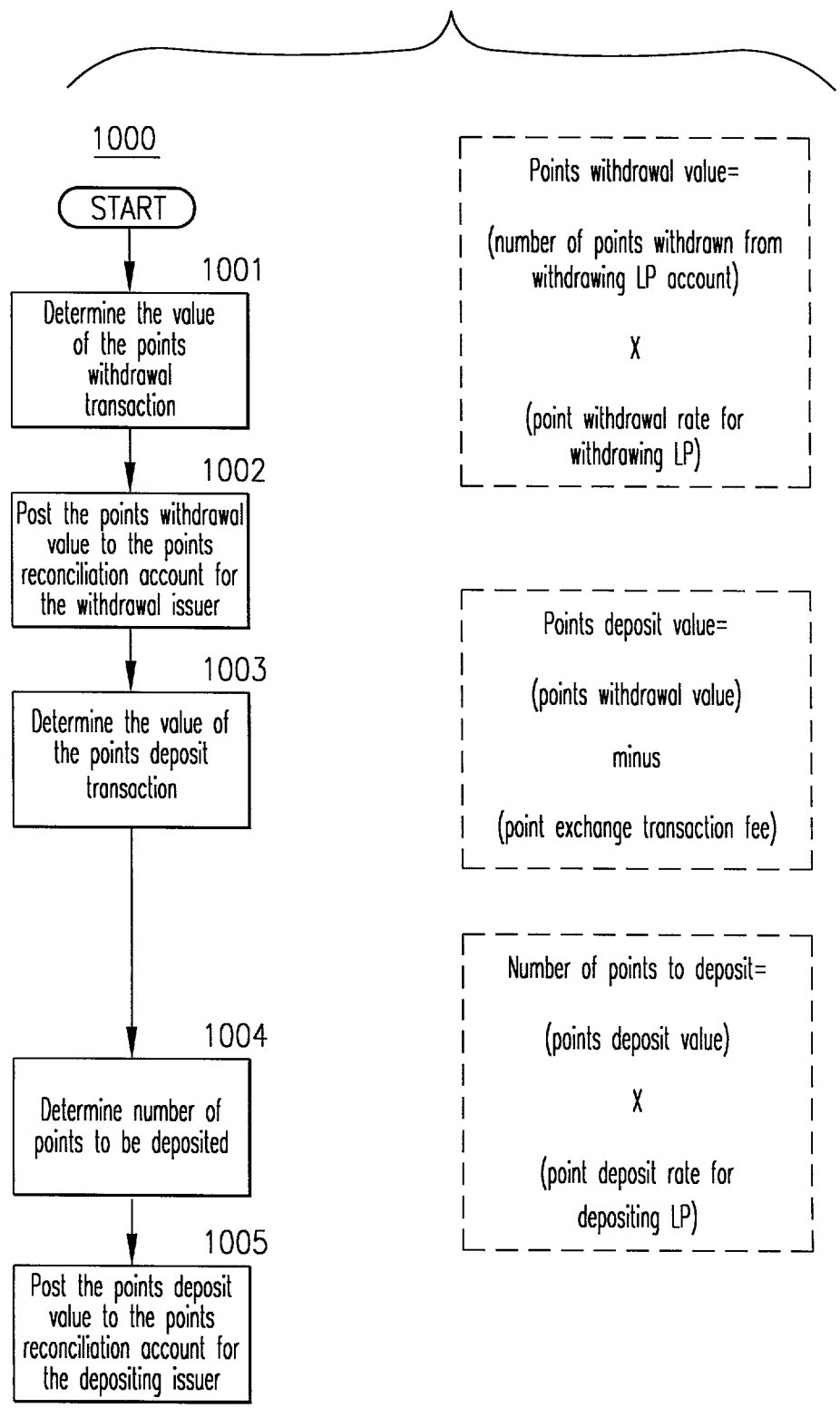

Referring now to FIG. 10, there is shown a program 1000 that is stored and executed by the transaction server 250 when a points exchange request is found on the transaction queue, as described above. Program 1000 calculates for a points exchange, the number of points to be deposited in the second or depositing issuer, based on the points withdrawal and deposit rates of the designated withdrawing and depositing issuers and the transaction fee levied by the transaction center 120 itself. First, step 1001 calculates the value of the points withdrawn. This is computed by taking the number of points to be withdrawn from the designated first issuer and multiplying it by the point withdrawal rate for the first issuer to provide a monetized value in terms of monetary units, e.g., dollars. In step 1002, this resulting points withdrawal value is posted to a reconciliation account for the designated withdrawing issuer on the master database 240. Each withdrawing and depositing issuer has a reconciliation account on the master database 240. The reconciliation account is used to reconcile all point transactions, as described in detail below. In step 1003, the value of the deposited points is calculated by subtracting a transaction fee that is levied on all point exchanges by the transaction center 120. This fee is illustratively a percentage of the monetized value of the withdrawn points. Next in step 1004, the points deposit value is applied to the purchase of points to be deposited in the designated depositing issuer account. The number of points to be deposited is computed by taking the remaining cash balance and multiplying it by the point deposit rate for the designated depositing issuer. Finally, in step 1005, the value of the deposited points is posted to a reconciliation account for the designated depositing issuer on the master database 240. It should be appreciated that this embodiment illustrates a point exchange from a single issuer to another single issuer. This method could easily be applied to point exchanges from multiple withdrawing issuers to multiple depositing issuers.

Figure 11:
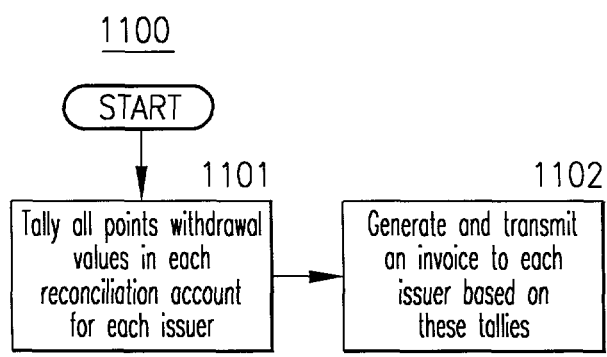
FIGS. 11 and 12 are flow diagrams which respectively represent the process of a program executed by the transaction server of FIG. 2 and the depositing point issuer's server of FIG. 2 to sum the monetized value of the points withdrawal transactions and the points deposit transactions, respectively, and generate commercial invoices therefore.

Referring now to FIG. 11, there is shown a program 1100, which is stored and executes on the transaction server 250 for reconciling all of the points withdrawals and generating appropriate invoices to the withdrawing points issuers. As described above, each points withdrawal has an associated cash value in the form of monetary units, e.g., dollars, which the withdrawing issuer must pay to the transaction center 120. As points withdrawal transactions are executed, the associated cash value of the transaction is posted to the reconciliation account for the withdrawing issuer, as described above. Periodically, the program 1100 is executed to generate invoices based on the postings in these reconciliation accounts. In step 1101, the transaction server 250 sums all of the points withdrawal postings in each of the reconciliation accounts. In step 1102, an invoice is generated and transmitted to each of the withdrawing issuers based on their withdrawal tally.

Figure 12:
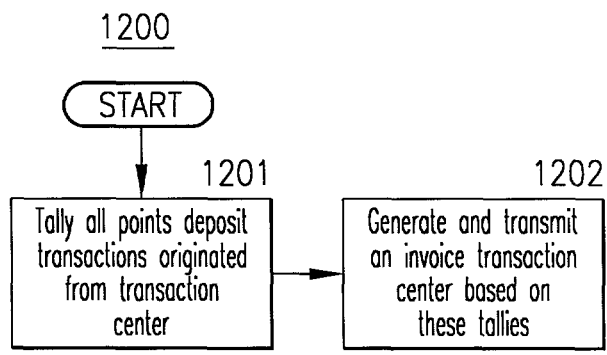

Referring now to FIG. 12, there is shown a program 1200 which is stored and executes on the issuer server 280 for reconciling all of the point deposits that transaction center 120 has initiated and for generating an appropriate invoice to the transaction center 120. Program 1200 is executed by each of the depositing issuers independently. As described above, each point deposit has an associated cash value in the form of monetary units, e.g., dollars, which the transaction center 120 must pay to the depositing issuer. As points deposit transactions are executed, it is the responsibility of the issuer to track the associated cash value of the transaction and periodically run program 1200 to generate invoices accordingly. In step 1201, the issuer server 280 sums all of the point deposit transactions that originated from the transaction center 120. In step 1202, an invoice from that particular issuer is generated and transmitted to the transaction center 120 based on the deposit tally.

What is claimed is:

1. A method of managing first and second points issuers, each of the first points issuer issuing first points and the second points issuer issuing second points at exchange rates set by the first and second points issuers respectively, the first points differing from the second points, the method implemented by a computer and comprising the steps of:
    (a) entering first and second exchange rates by the first and second points issuers respectively;
    (b) entering a customer's request for buying first points and selling second points;
    (c) determining, by a processor, the presence or absence of each of the first and second exchange rates; and
    (d) blocking, by the processor, the selling and/or buying of points in the absence of either of the first or second exchange rates.

2. A system for managing a loyalty points program at an exchange rate set by a proprietor of the points program, said system comprising:
    (a) at least one terminal associated with the points program and including a terminal input, a terminal database and a terminal server programmed at least in part to effect the following steps:
        (i) respond to a customer request to withdraw from and/ or deposit points into said one terminal,
        (ii) a point program proprietor entering and storing in said terminal database exchange rates for the points of the loyalty points program; and
        (iii) detect the absence of the exchange rates for the points program to transmit a blocking signal; and (b) a transaction center coupled by a data transmission path to said one terminal and including a center input and a center server programmed to effect the following steps:
  (i) respond to a customer request on said center input for transmitting via the data transmission path to said one terminal the customer request whereby points are withdrawn and/or deposited into the loyalty points program associated with said one terminal; and
  (ii) respond to the blocking signal to prevent the transmission of the customer request.

* * * * *